(12) United States Patent
Leclercq

(10) Patent No.: US 9,177,152 B2
(45) Date of Patent: Nov. 3, 2015

(54) FIRMWARE AUTHENTICATION AND DECIPHERING FOR SECURE TV RECEIVER

(75) Inventor: Maxime Leclercq, Encinitas, CA (US)

(73) Assignee: MaxLinear, Inc., Carlsnad, CA (US)

( * ) Notice: Subject to any disclaimer, the term of this patent is extended or adjusted under 35 U.S.C. 154(b) by 187 days.

(21) Appl. No.: 13/072,069

(22) Filed: Mar. 25, 2011

(65) Prior Publication Data

US 2012/0079287 A1    Mar. 29, 2012

Related U.S. Application Data

(60) Provisional application No. 61/372,390, filed on Aug. 10, 2010, provisional application No. 61/319,198, filed on Mar. 30, 2010, provisional application No. 61/318,744, filed on Mar. 29, 2010, provisional application No. 61/318,220, filed on Mar. 26, 2010.

(51) Int. Cl.
*G06F 21/00* (2013.01)
*G06F 21/57* (2013.01)

(52) U.S. Cl.
CPC .................................. *G06F 21/575* (2013.01)

(58) Field of Classification Search
CPC ................................ G06F 21/00; G06F 12/14
See application file for complete search history.

(56) References Cited

U.S. PATENT DOCUMENTS

| | | | |
|---|---|---|---|
| 6,424,717 B1 | 7/2002 | Pinder et al. | |
| 6,882,729 B2 | 4/2005 | Arling et al. | |
| 7,409,570 B2 | 8/2008 | Suzuoki | |
| 7,506,358 B1 | 3/2009 | Fry et al. | |
| 8,180,735 B2 | 5/2012 | Ansari et al. | |
| 2003/0079138 A1 | 4/2003 | Nguyen et al. | |
| 2003/0163713 A1 | 8/2003 | Cocchi et al. | |
| 2004/0025010 A1 | 2/2004 | Azema et al. | |
| 2004/0039911 A1 | 2/2004 | Oka et al. | |
| 2004/0044906 A1 | 3/2004 | England et al. | |
| 2004/0181303 A1 | 9/2004 | Walmsley | |
| 2004/0210796 A1 | 10/2004 | Largman et al. | |
| 2005/0005138 A1 | 1/2005 | Awai | |
| 2005/0138397 A1* | 6/2005 | Kusudo et al. | 713/188 |

(Continued)

OTHER PUBLICATIONS

International Preliminary Report on Patentability for PCT Application No. PCT/US2011/027299, mailed on Sep. 20, 2012, 7 pages.

(Continued)

*Primary Examiner* — Brandon Hoffman
*Assistant Examiner* — Nega Woldemariam
(74) *Attorney, Agent, or Firm* — Kilpatrick Townsend & Stockton LLP

(57) ABSTRACT

A method for authenticating and deciphering an encrypted program file for execution by a secure element includes receiving the program file and a digital certificate that is associated with the program file from an external device. The method stores the program file and the associated certificate in a secure random access memory disposed in the secure element and hashes the program file to obtain a hash. The method authenticates the program file by comparing the obtained hash with a checksum that is stored in the certificate. Additionally, the method writes runtime configuration information stored in the certificate to corresponding configuration registers disposed in the secure element. The method further generates an encryption key using a seed value stored in the certificate and a unique identifier disposed in the secure element and deciphers the program file using the generated encryption key.

28 Claims, 18 Drawing Sheets

(56) References Cited

U.S. PATENT DOCUMENTS

| | | |
|---|---|---|
| 2005/0268086 A1 | 12/2005 | Kim |
| 2006/0015731 A1 | 1/2006 | Lakshmi Narayanna |
| 2006/0117177 A1* | 6/2006 | Buer .............................. 713/155 |
| 2006/0236113 A1 | 10/2006 | Uzawa |
| 2006/0259743 A1 | 11/2006 | Suzuoki |
| 2006/0272022 A1 | 11/2006 | Loukianov et al. |
| 2007/0074045 A1 | 3/2007 | Van Essen et al. |
| 2007/0150734 A1 | 6/2007 | Gervais et al. |
| 2007/0180464 A1 | 8/2007 | Dellow et al. |
| 2007/0192610 A1 | 8/2007 | Chun et al. |
| 2007/0294494 A1 | 12/2007 | Conti et al. |
| 2008/0005586 A1 | 1/2008 | Munguia |
| 2008/0016349 A1 | 1/2008 | Kahn |
| 2008/0101604 A1 | 5/2008 | Kocher et al. |
| 2008/0183992 A1 | 7/2008 | Martin et al. |
| 2008/0219494 A1 | 9/2008 | Chen |
| 2008/0235406 A1 | 9/2008 | Meijer et al. |
| 2008/0240230 A1 | 10/2008 | Oxman et al. |
| 2008/0267410 A1 | 10/2008 | Dellow |
| 2009/0044233 A1 | 2/2009 | Brandt et al. |
| 2009/0049220 A1 | 2/2009 | Conti et al. |
| 2009/0094597 A1 | 4/2009 | Moskalik et al. |
| 2009/0109487 A1 | 4/2009 | Tsukada |
| 2009/0144557 A1 | 6/2009 | Sutton |
| 2010/0014671 A1 | 1/2010 | Moroney |
| 2010/0020963 A1 | 1/2010 | Candelore |
| 2010/0293614 A1 | 11/2010 | Vilppola et al. |
| 2011/0138192 A1 | 6/2011 | Kocher et al. |
| 2012/0036372 A1 | 2/2012 | Leclercq |
| 2012/0042157 A1 | 2/2012 | Leclercq |
| 2012/0060039 A1 | 3/2012 | Leclercq |
| 2012/0079261 A1 | 3/2012 | Leclercq |
| 2012/0079279 A1 | 3/2012 | Leclercq |
| 2012/0198224 A1 | 8/2012 | Leclercq |

OTHER PUBLICATIONS

Non-Final Office Action for U.S. Appl. No. 13/021,178, mailed on Sep. 17, 2012, 28 pages.
Leach et al. "A Universally Unique Identifier (UUID) URN Namespace", downloaded from http://www.ietf.org/rfe/rfe4122.txt, on Sep. 8, 2012, 30 pages.
Brusilovsky et al. "Password-Authenticated Diffie-Hellman Exchange (PAK)", downloaded from http://tools.ietf.org/html/draft-brusilovsky-pak-09, on Sep. 8, 2012, 13 pages.
Non-Final Office Action for U.S. Appl. No. 13/041,256, mailed on Sep. 14, 2012, 33 pages.
International Preliminary Report on Patentability for PCT Application No. PCT/US2011/024543, mailed on Aug. 23, 2012, 8 pages.
International Preliminary Report on Patentability for PCT Application No. PCT/US2011/023749, mailed on Aug. 16, 2012, 9 pages.
International Search Report and Written Opinion corresponding to the PCT Application No. PCT/US2011/023749, date of mailing Apr. 6, 2011, 18 pages.
International Search Report and Written Opinion corresponding to the PCT Application No. PCT/US2011/024543, date of mailing Apr. 6, 2011, 17 pages.
International Search Report and Written Opinion corresponding to the PCT Application No. PCT/US2011/030581, date of mailing May 25, 2011, 8 pages.
International Search Report and Written Opinion corresponding to the PCT Application No. PCT/US2011/030378, date of mailing May 31, 2011, 13 pages.
International Search Report and Written Opinion corresponding to the PCT Application No. PCT/US2011/030033, dated of mailing Nov. 8, 2011, 14 pages.
International Search Report and Written Opinion corresponding to the PCT Application No. PCT/US2011/027299, dated of mailing Oct. 27, 2011, 14 pages.
Non-Final Office Action for U.S. Appl. No. 13/026,000, mailed on Dec. 26, 2012, 26 pages.
International Preliminary Report on Patentability for PCT Application No. PCT/US2011/030033, mailed on Oct. 11, 2012, 8 pages.
International Preliminary Report on Patentability for PCT Application No. PCT/US2011/030378, mailed on Oct. 11, 2012, 7 pages.
International Preliminary Report on Patentability for PCT Application No. PCT/US2011/030581, mailed on Oct. 11, 2012, 6 pages.
Non-Final Office Action for U.S. Appl. No. 13/076,172, mailed on Nov. 7, 2013, 20 pages.
Non-Final Office Action for U.S. Appl. No. 13/075,038, mailed on Feb. 3, 2014, 23 pages.
Notice of Allowance for U.S. Appl. No. 13/205,578, mailed on Mar. 12, 2014, 17 pages.
Final Office Action for U.S. Appl. No. 13/026,000, mailed on Mar. 14, 2014, 22 pages.
Non Final Office Action for U.S. Appl. No. 13/041,256, mailed on May 7, 2014, 29 pages.
Notice of Allowance for U.S. Appl. No. 13/076,172, mailed on May 29, 2014, 7 pages.
Notice of Allowance for U.S. Appl. No. 13/205,578, mailed on Jul. 18, 2014, 8 pages.
Final Office Action for U.S. Appl. No. 13/021,178, mailed on May 23, 2013, 20 pages.
Final Office Action for U.S. Appl. No. 13/041,256, mailed on May 24, 2013, 37 pages.
Final Office Action for U.S. Appl. No. 13/026,000, mailed on Jul. 30, 2013, 24 pages.
Final Office Action for U.S. Appl. No. 13/075,038, mailed on Sep. 18, 2014, 19 pages.
Notice of Allowance for U.S. Appl. No. 13/076,172, mailed on Sep. 8, 2014, 8 pages.

* cited by examiner

FIRMWARE AUTHENTICATION AND DECIPHERING FOR SECURE TV RECEIVER

CROSS-REFERENCES TO RELATED APPLICATIONS

The present application claims benefit under 35 USC 119 (e) of the following US applications, the contents of all of which are incorporated herein by reference in their entirety:

- U.S. application No. 61/318,220, filed Mar. 26, 2010, entitled "Firmware Authentication and Deciphering for Secure TV Receiver";
- U.S. application No. 61/318,744, filed Mar. 29, 2010, entitled "Generation of SW Encryption Key During Silicon Manufacturing Process";
- U.S. application No. 61/319,198, filed Mar. 30, 2010, entitled "Control Word Obfuscation in Secure TV Receiver"; and
- U.S. application No. 61/372,390, filed Aug. 10, 2010, entitled "Control Word Obfuscation in Secure TV Receiver".

The present application is related to and incorporates by reference the entire contents of the following US applications:

- U.S. application Ser. No. 13/021,178, filed Feb. 4, 2011, entitled "Conditional Access Integration in a SOC for Mobile TV Applications";
- U.S. application Ser. No. 13/026,000, filed Feb. 11, 2011, entitled "RAM Based Security Element for Embedded Applications"; and
- U.S. application Ser. No. 13/041,256, filed Mar. 4, 2011, entitled "Code Download and Firewall for Embedded Secure Application".

BACKGROUND OF THE INVENTION

The present invention relates to information processing, and more particularly, to an integrated circuit device and method for authenticating and deciphering an encrypted program file that may be used to provide conditional access to protected information data such as pay TV and others.

There are several well-known digital radio and digital TV broadcast standards. In Europe, the digital radio broadcast is the DAB (Digital Audio Broadcasting) adopted by the ITU-R standardization body and by ETSI. The digital TV standard is DVB (Digital Video Broadcasting) in Europe, ATSC (Advanced Television Systems Committee) in the U.S., and ISDB (Integrated Services Digital Broadcasting) in Japan and South America. In addition to these standards, there are also mobile TV standards which relate to the reception of TV on handheld devices such as mobile phones or the like. Some well-known mobile TV standards are DVB-H (Digital Video Broadcasting-Handheld), CMMB (China), DMB (Digital Multimedia Broadcasting), and Mediaflo.

In most digital TV broadcasting services, the service providers scramble and encrypt the transmitted data streams to protect the broadcasted content and require their customers or users to install "security protection" mechanisms to decrypt and descramble the content. Security protection mechanisms such as digital rights management enable users to store content. Conditional access systems are other security protection mechanisms that allow users to access and view content but may or may not record the viewed content.

In a typical pay-TV system, the conditional access software runs on a dedicated secure element implementing robust mechanisms so as to prevent a malicious entity ("hacker") from gaining access to the broadcast system secret to decipher the TV content. The CA instruction code and keys provisioned by the CA provider adapted to ensure security are typically stored in a non-volatile memory, such as an EEPROM or Flash, which are relatively expensive and require a specifically tuned CMOS process and additional process steps for fabrication and testing.

FIG. 1 is a block diagram of a conventional TV receiver 100 performing conditional access (CA) functions. Receiver 100 includes a TV demodulator 110 coupled to a suitable antenna 105 for receiving broadcast content. Demodulator 110 is connected to a secure element 120. The connection can be a proprietary interface or a standard interface. Secure element 120 may be provided by the service provider and controls access to a broadcast service by descrambling an encrypted broadcast transmission. Secure element 120 may also hold service entitlement information controlled by the service provider. The service provider may communicate with the secure element using encrypted messages that carry descrambling keys and other service management information. Secure element 120 descrambles encrypted data streams received from the TV demodulator and provides the descrambled data streams to a video and audio decoder 130. A display 140 coupled to the video and audio decoder displays the decoded video and audio data streams. In general, secure element 120 may be provided in several forms and in multiple packaging options. For example, the secure element may be a dedicated surface mount device mounted on the receiver, a SIM card, a secure SD card, or a module. The secure element typically includes a crypto processor, a secure CPU, read-only memory (ROM), and electrical erasable and programmable ROM (EEPROM) or Flash, as shown in FIG. 1.

FIG. 2 is a block diagram of a conventional secure element 200 showing components incorporated in the secure element 120 of FIG. 1. Secure element 200 includes a demodulator interface 210 that establishes a physical and electrical connection with the demodulator 110. Typically, the physical and electrical connection is a proprietary hardware interface that enables a user to plug the secure element to the TV demodulator. Secure element 200 also includes a secure CPU 220 that is configured to decrypt messages or data streams that are transmitted by the service providers. Secure element 200 further includes a plurality of hardware accelerators 230-1, 230-2, . . . , 230-n that assist the secure CPU for descrambling data streams and decode specific messages from the service provider. Secure element 200 additionally includes read-only memory 240 (ROM) and EEPROM/Flash memory 250. The ROM and EEPROM/Flash memory are programmed by the conditional access (CA) provider and contain CA firmware and decryption keys. When enabled by the user, CPU 220 executes program code stored in ROM and EEPROM/Flash memory and starts processing data streams received through the demodulator interface 210.

As shown in FIG. 1, the secure element 120 may include two physical interfaces, one for receiving encrypted data streams and the other one for sending decrypted data streams back to the demodulator. Other physical interfaces may exist for facilitating communication between the secure element and the demodulator.

It can be seen that the conventional secure element has a hardware architecture that is inflexible and adds costs to service providers. Furthermore, conventional techniques do not appear to address the concerns of service providers, CA operators, and content owners, namely, to provide security to the operation of their devices.

BRIEF SUMMARY OF THE INVENTION

Embodiments of the present invention provide an integrated circuit that integrates functions (secure element)

required to achieve security in a monolithic silicon device formed on the same substrate using a conventional CMOS process, e.g., a CMOS system-on-a-chip (SOC). In an embodiment, the integrated circuit includes a demodulator having an interface unit for receiving a program file and a certificate that is associated with program file from an external memory device. The integrated circuit also includes a secure element that is communicatively and electrically coupled to the demodulator and configured to authenticate the received program file and the certificate. The secure element includes a non-volatile memory register that contains a unique identifier of the integrated circuit, a read-only access memory (ROM) having a boot code, a static random access memory (RAM) for storing the received program file, and a processing unit that is coupled to the read-only memory and the static random access memory. In an embodiment, the secure element is locked after the program file and the certificate are stored in the random access memory, thereby preventing the demodulator from accessing the secure element.

The processing unit is configured to authenticate the program file and the certificate by executing the boot code, wherein the authentication of the certificate includes computing a first hash value of a portion of the certificate and comparing the first hash value with the unique identifier. In a specific embodiment, the unique identifier is burned or blown during the integrated circuit manufacturing process. In an embodiment, the external memory device may include a Flash memory. In an embodiment, the boot code may include computer readable and executable instruction code that performs multiple security validations on the certificate and on the program file. In an embodiment, the portion of the certificate includes information data associated with a secure state of the program file to ensure that the program file is authentic and has not been modified. In an embodiment, the information data may include a software vendor key, a software distribution key, and/or a software personalization key that are referred to as public keys, and each of the public keys is associated with a signature that is also included in the certificate. In an embodiment, the secure element may perform an encryption algorithm (e.g., an RSA encryption) on the signature to obtain an encryption key and compare the obtained encryption key with the associated public key. In the event that the encryption key with regard to its signature does not match the associate public key, the secure element may disable or remove the program file stored in the random access memory.

In an embodiment, the secure element performs a series of validations for authenticating the program file. The series of validations may include a chain of trust verification, a boot certificate validation, a certificate binding validation, and a firmware image validation that are performed in sequence.

In an embodiment, the secure element further deciphers the program file using an encryption key that is generated using the unique identifier (HUK) upon a successful authentication. In a specific embodiment, the unique identifier is burned or blown during the integrated circuit manufacturing process.

In an embodiment, a device includes a unique identifier, a processing unit and a random access memory and a read-only memory, both memories are coupled to the processing unit. The read-only memory includes instruction codes that cause the processing unit to read in a firmware image and a certificate associated with the firmware image, and stores the firmware image and the certificate into the random access memory. The instruction codes also cause the processing unit to simultaneously authenticate the certificate and the firmware image. In an embodiment, the simultaneously authentication of the firmware image and the certificate includes generating an encryption key using a seed number disposed in the certificate and the unique identifier, encrypting or decrypting the firmware image using the generated encryption key, hashing the encrypted or decrypted firmware image to obtain a hash, encrypting the public key using the obtained hash, and comparing the encrypted public key with a digital signature disposed in the certificate.

Embodiments of the present invention also disclose a method for authenticating a program code for execution by an information processing apparatus. The method includes receiving the program code and a certificate that is associated with the program code from an external device. The method also includes storing the received program code and the certificate in a secure random access memory disposed in the information processing apparatus and hashing a portion of the certificate to obtain a first hash value. The method authenticates the certificate by comparing the first hash value with a unique identifier stored in a non-volatile memory register of the information processing apparatus. The method further includes disabling or removing the stored program code if the hash value does not match the unique identifier.

In an embodiment, the portion of the certificate may include information data associated with a secure state of the program code. The information data may include a public key and a signature, both the public key and the signature may be associated with a vendor or a service provider. In an embodiment, the method may further hash the program code to obtain a second hash value and perform an encryption algorithm on a crypto public key public key to obtain an encryption key and authenticates the certificate based on a result of comparison between the encryption key and a signature disposed in the certificate.

A specific embodiment of the present invention provides a method for authenticating a firmware image for execution by a secure element at runtime. The method includes receiving the firmware image and a digital certificate that is associated with a secure state of the firmware image, and storing the firmware image and the certificate in a random access memory disposed in the secure element. The method also includes hashing the firmware image to obtain a hash value and authenticating the firmware image based on a comparison result between the hash value and a checksum disposed in the digital certificate. In addition, the method includes writing runtime configuration data disposed in the digital certificate to associated configuration registers in the secure element.

In an embodiment, the authentication of the program may be triggered by software, a hardware timer, or when the secure element enters or exits a sleep period.

Other embodiments, features and advantages of the present invention may be more apparent upon review of the specification and the claims to follow.

BRIEF DESCRIPTION OF THE DRAWINGS

Preferred embodiments of the present invention are described below, by way of example only, with reference to the accompanying drawings, in which.

DETAILED DESCRIPTION OF THE INVENTION

Conditional access is used by TV broadcasters to generate revenue. To achieve this, security guidelines are used to protect the keys provisioned to the user and to guarantee that no hacker or malicious entity can crack the system and watch contents for free. These guidelines, also referred to as security requirements, define methods adapted to prevent misuse of the SOC (system-on-chip) device and its associated firmware, and furthermore to inhibit unauthorized access to secrets, such as keys, operating modes, etc. The SOC security framework described herein defines hardware (HW), software (SW), or a combination thereof (i.e., firmware) to achieve these objectives.

Figure 1:
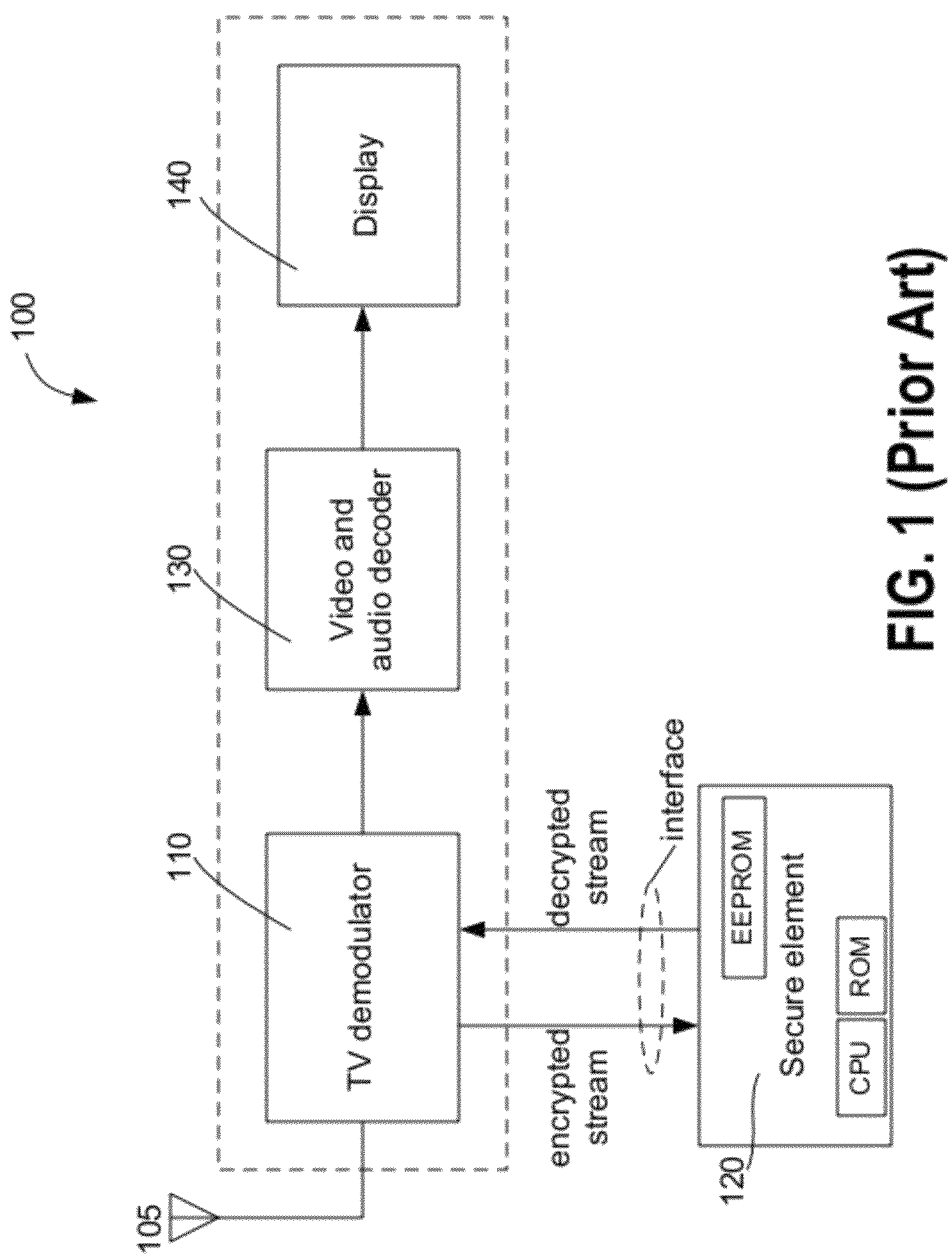
FIG. 1 is a block diagram of a conventional TV receiver 100 performing conditional access (CA) functions.
Figure 2:
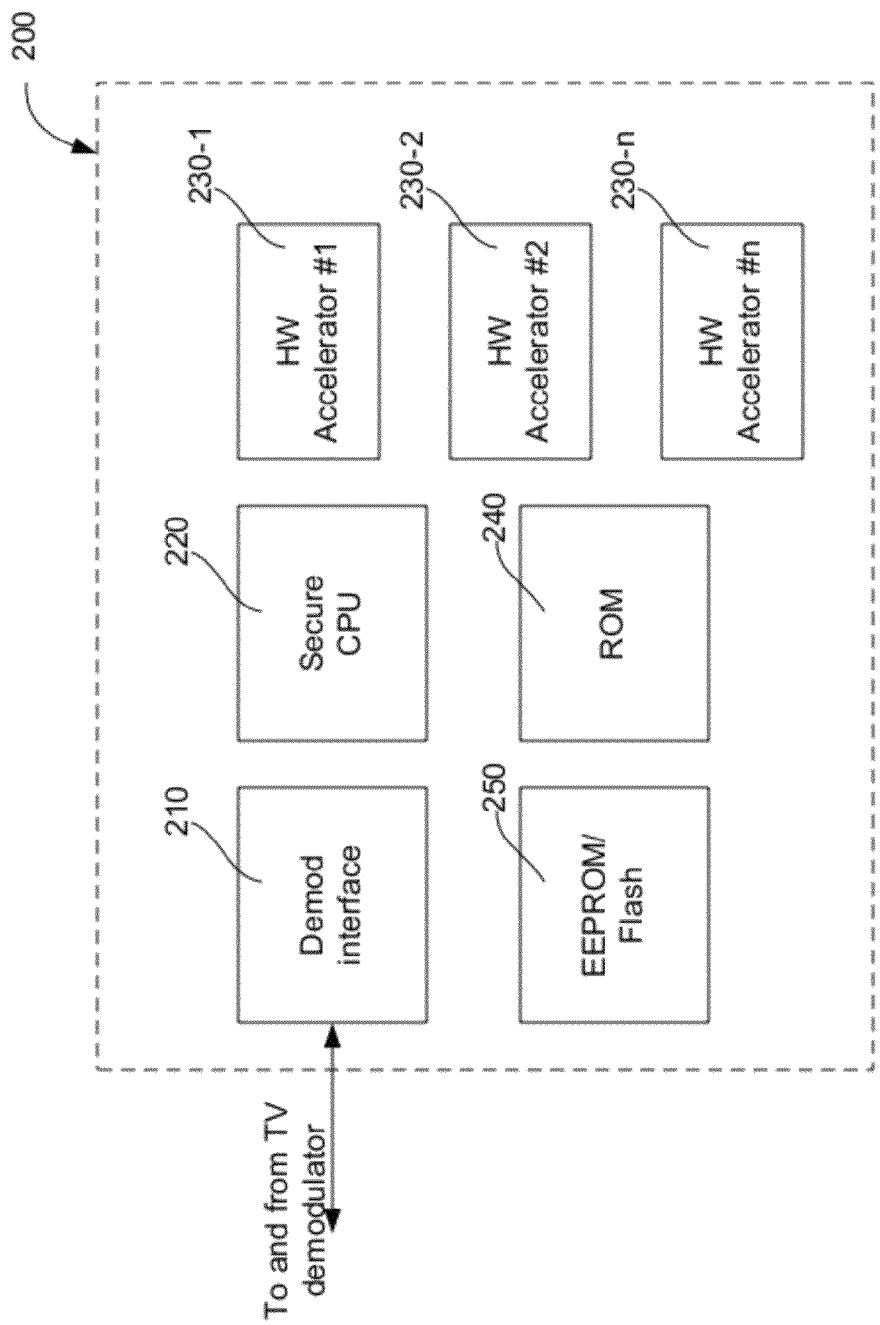
FIG. 2 is a block diagram of a conventional secure element 200 used in pay-TV applications.
Figure 3:
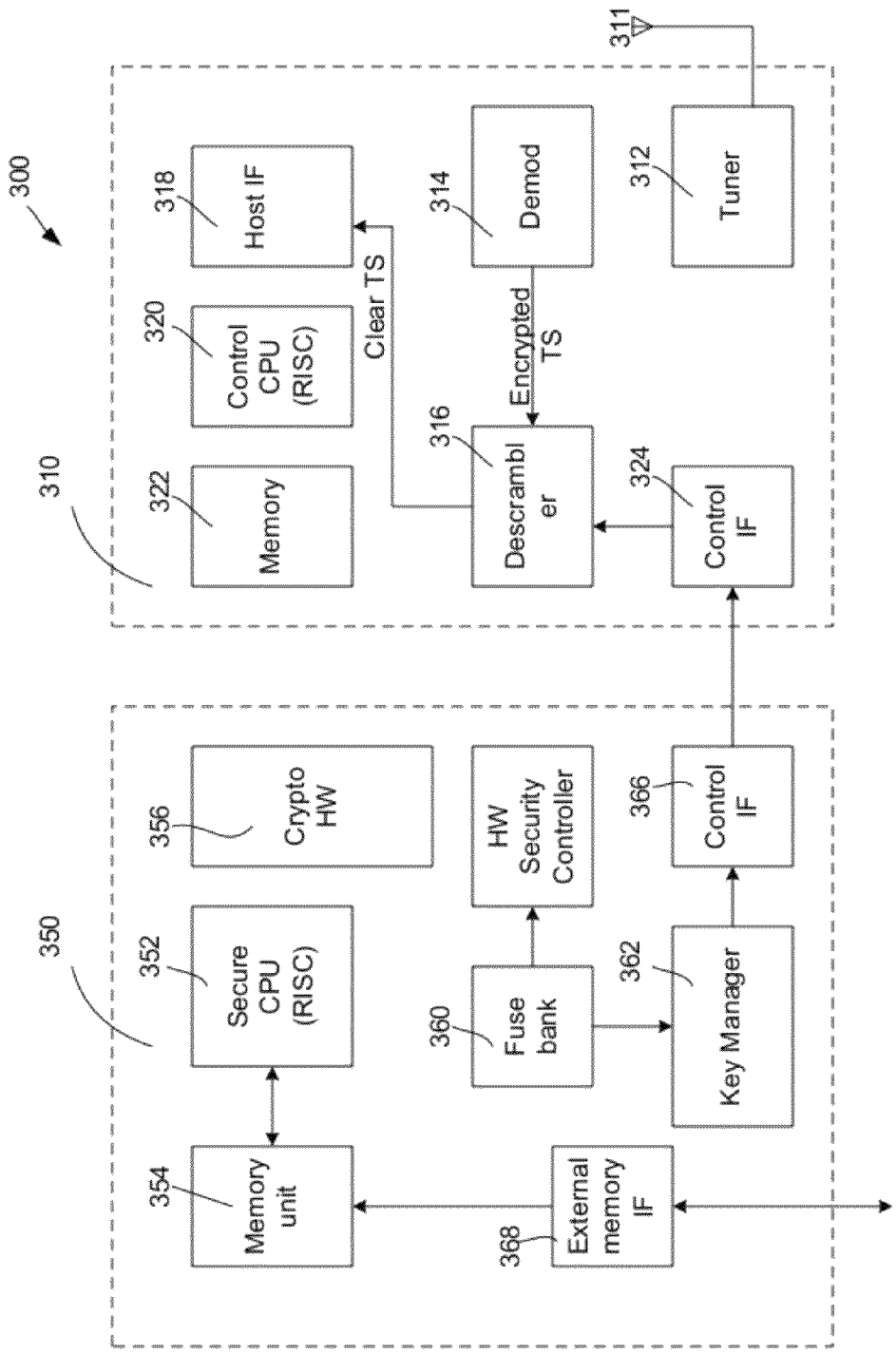
FIG. 3 is a simplified block diagram of an integrated conditional access sub-system in an SOC according to an embodiment of the present invention.

FIG. 3 is a simplified block diagram of a receiver system on a chip (SOC) 300 configured to perform tuning, demodulating, CA security, and the like, in accordance with an embodiment of the present invention. Receiver system 300 includes a digital broadcast receiver 310 that may be capable of receiving signals in a number of different frequency bands of interest and/or in a number of different formats. By way of example, receiver system 300 may be capable of receiving any one or more of the standards mentioned above or other suitable standards. In an exemplary embodiment, receiver system 300 also includes a conditional access security (CAS) sub-system 350.

Digital broadcast receiver 310 includes a tuner 312 that is connected to an antenna 311. Although an antenna is shown, tuner 312 may be connected to a number of antennas that is configured to suit different frequency bands of interest. The tuner frequency translates received signals and provide them to a demodulator 314, which may demodulate the frequency translated signals into multiple data streams (audio, video, text, and others). Receiver 310 also includes a descrambler 316 that descrambles the data streams (indicated as encrypted TS) and provides clear (i.e., descrambled) data streams (indicated as clear TS in FIG. 3) to a host via a host interface unit 318. Receiver 310 further includes a control processor 320 and a memory unit 322 that contains software (program code) to enable a user to select a service and to program the tuner to a desired frequency. In an embodiment, the memory 322 may include dynamic random memory and/or permanent memory such as read-only memory (ROM).

Receiver 310 also includes a control interface unit 324 that connects the digital broadcast receiver 310 with the conditional access security sub-system 350. As described in section above, control access is a protection of content required by content owners or service providers. Conventional access approaches use dedicated surface mount devices such as Smartcard, SIM card, secure SD card or the like. In conventional approaches, CA instruction code and keys provisioned by CA providers adapted to ensure security are typically stored in a non-volatile memory, such as an EEPROM or Flash, which are relatively expensive and cannot be easily and cost effectively integrated using standard CMOS fabrication processes. A novel conditional access security (CAS) sub-system according to an embodiment of the present invention will be described in detail below.

Referring to FIG. 3, CAS sub-system 350 includes a secure processor 352 coupled to a memory unit 354. The secure CPU may be a RISC CPU configured to process various processing operations. CAS sub-system 350 further includes a crypto hardware 356 that, in an embodiment, includes suitable crypto logic, circuitry (e.g., hardware) for performing cryptographic operations. In a specific embodiment, crypto hardware 356 may be a crypto processor configure to perform cryptographic functions such as processing digital signature, key management, identifying public keys and others due to the secure access requirements. During the manufacturing process, cryptographic hardware may generate a unique crypto ID (identity) for the receiver SOC 300 and a unique encryption key. CAS sub-system also includes a fuse bank 360. In an embodiment, fuse bank 360 may include electrically programmable fuses on the chip. In an embodiment, the fuse bank may contain an array of electrically programmable registers, each having a number of bits. The bits can be programmed during the manufacturing process or later by the service provider as the device is shipped to the user. In an embodiment, corresponding bits of the fuse bank are burned or blown according to the value of the unique device ID and a certificate key. In a specific embodiment, memory unit 354 includes random access memory and read-only memory. In contrast to conventional techniques, memory unit 354 does not includes EEPROM and/or Flash memory to facilitate the integration process and to minimize cost by using conventional (i.e., standard) CMOS process.

In an embodiment, the receiver SOC 300 includes an external memory interface 368 configured to interface with an external memory. Although the external memory interface 368 is shown to be located in the CAS sub-system 350, it can be located in any part of the receiver SOC as further disclosed below. In an embodiment, the external memory interface 368 can include a SD memory card slot, a multimedia card (MMC), a micro SD card slot, a mini SDHC, a microSDHC, a Memory Stick slot, a PCMCIA interface, a USB interface, a serial or a parallel interface, and others. The external memory can be a commercial off-the-shelf Flash memory in a specific embodiment.

In accordance with embodiments of the present invention, the conditional access (CA) software code is stored in a random access memory (RAM). The CA software is dynamically downloaded from an external non-volatile flash memory via the external memory interface 368 to the RAM during the power cycle of the security sub-system. However, because the external flash storing the CA software is outside the security perimeter it must first be authenticated and checked for any malicious alteration (such as bypass of the security function that could be inserted by a hacker). The secure sub-system implements a protocol to authenticate the firmware using a public key algorithm and digital certificate provisioned during manufacturing.

Figure 4:
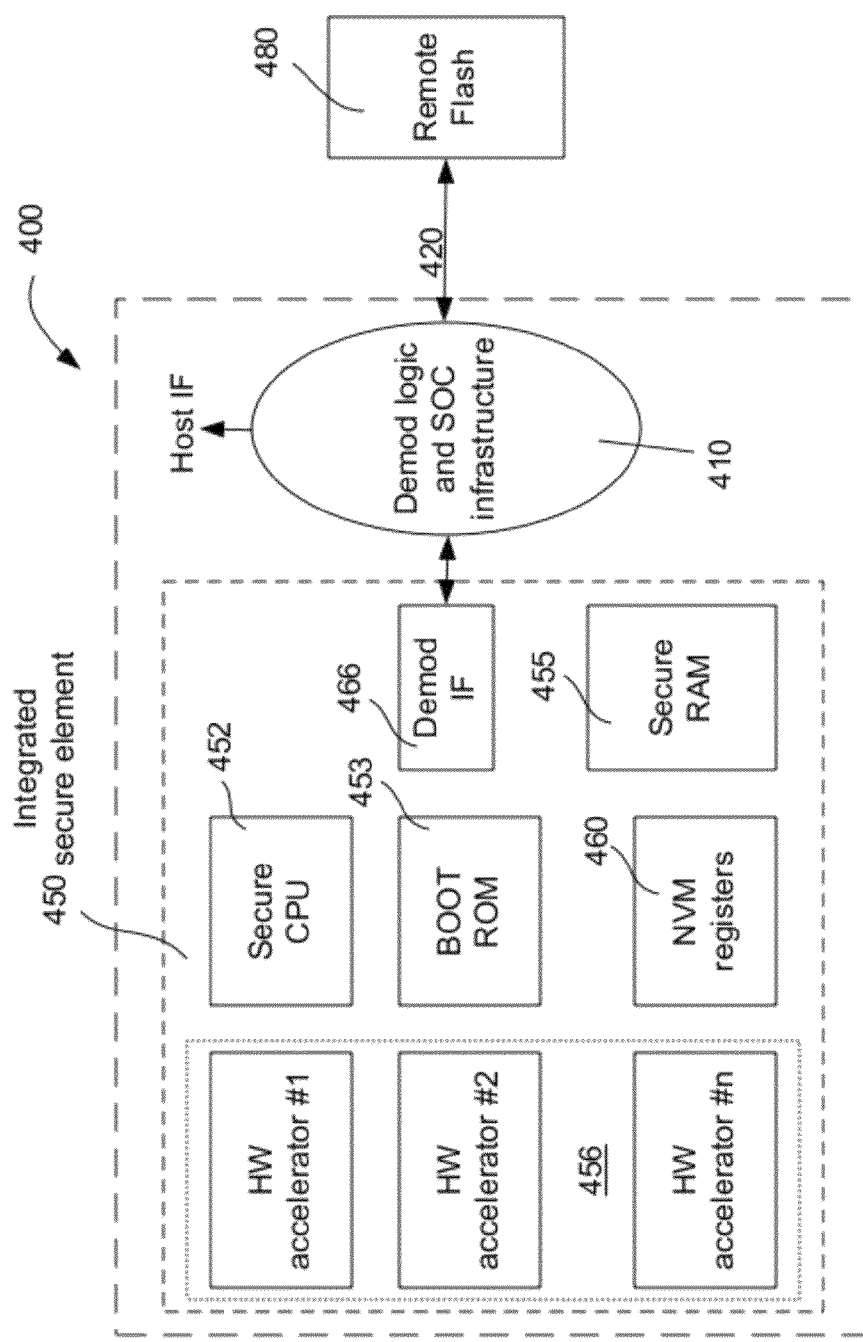
FIG. 4 is a simplified block diagram of an integrated secure element disposed in a demodulator SOC according to an embodiment of the present invention.

FIG. 4 is a block diagram of a demodulator SOC 400 including a demodulation logic 410 coupled to a remote memory device 480 (e.g., Flash memory) and an integrated secure element 450 according to an embodiment of the present invention. Demodulation logic 410 may have a similar configuration of the receiver 310 shown in FIG. 3. For example, demodulation logic 410 may include a demodulator, a descrambler, a control CPU, a memory unit that comprises RAM and/or ROM, a host interface, and a control interface unit; the functions of those elements have been described in details in the sections above and won't be repeated herein for brevity. The demodulator logic 410 may further include system-on-a chip infrastructure such as registers, IO ports, an host interface, an external memory interface link 420, which may be similar to the external memory interface port 368 shown in FIG. 3 and described above. In an embodiment, remote or external Flash memory 480 may be coupled to the demodulator SOC 400 through the interface link 420. The coupling can be by means of a physical connection such as a SD card connector or a USB connector. In another embodiment, the coupling can be by means of an optical (e.g., infrared) or radio wave (e.g., Bluetooth, wireless LAN IEEE802.11, or the like) communication link.

In an embodiment, integrated secure element 450 includes a secure CPU 452, a boot read-only memory (ROM) 453, a secure random access memory (RAM) 455, multiple non-volatile memory registers (or fuse banks) 460. CPU 452 may include an adder and logic for executing arithmetic operations or comparative decisions. In an embodiment, the non-volatile memory registers are implemented using fuse cells that can be fabricated using standard CMOS processes. In an embodiment, the non-volatile memory registers are programmed (burned or blown) during the silicon manufacturing process to store information such as the device ID, the root public key, and others. Integrated secure element 450 also includes multiple hardware accelerators 456 that can be one or more crypto processors as described above in association with crypto hardware 356 of FIG. 3.

In order to minimize cost, the CA software code is stored in the secure RAM 455 according to an embodiment of the present invention. CA software is understood as instructions, one or more sets of instructions, data files, or executable applications that are provided to the secure CPU 452 for execution. CA software is dynamically downloaded from the remote (external) flash memory 480 to the RAM 455 ("RAM-ware") during the power cycle of the integrated secure element 450. Because CA software is downloaded from the external Flash memory, it must be first authenticated by the integrated secure element 450. In an embodiment, the secure element operates a protocol to authenticate the RAM-ware using a public key algorithm and a digital certificate (e.g., a unique device ID) that is provided during the manufacturing of the demodulator SOC. In an embodiment, the authentication process can be assisted and accelerated using hardware accelerators 456.

In an embodiment, CA software is received by the demodulator logic from the external memory and transferred to the secure RAM 455 via a demodulator interface circuit 466. In contrast to conventional secure elements that store the CA software code in EEPROM and/or Flash memory, embodiments of the present invention provides a RAM-ware architecture that can be updated securely and easily, e.g., by downloading firmware (i.e., software, program codes, data files) stored in external memories. The downloaded firmware is authenticated by the secure element running boot authenticate programs from the boot ROM 453. Because the RAM-ware architecture does not require EEPROM and/or Flash memory that requires among other things a double poly process or a tunnel oxide process and expensive testing equipment and procedures, the RAM-based architecture of the present invention can be cost effectively produced using standard CMOS processes.

In an embodiment, the integrated secure element produces an attribute based on a digital certificate contained in the received software (now RAM-ware because it is now stored in the secure RAM) and provides the attribute to the demodulator logic for descrambling the received data streams (not shown). In some embodiments, the attribute can be a secure bit pattern or a secure codeword to enable the descrambling process in the demodulator logic 410.

In an embodiment, the integrated secure element 450 is activated when the TV application is enabled by the user. When the TV application is enabled, the demodulator logic causes the boot ROM to execute the boot instructions and activate the integrated secure element. During the boot process, the conditional access (CA) firmware stored in the external flash memory is downloaded to the RAM disposed in the secure element, so that the CPU starts operating.

As described above, the remote Flash memory contains conditional access (CA) executable applications or data files that are dynamically loaded to the RAM 455 disposed in the integrated secure element. In an embodiment, the external memory contains a digital certificate that is generated by the CA vendor or the demodulator SOC device manufacturer and signed with the root private key or a derivative of the root key using public key infrastructure (PKI). In an embodiment, the digital certificate may be unique to each demodulator SOC device and contains a device identification (ID) code. In an embodiment, the same identification code may also be stored in one or more of the non-volatile registers 460. In an embodiment, the non-volatile registers 460 may also store a digital signature of the CA software or CA firmware. In an embodiment, the boot ROM authenticates the CA firmware by means of the digital certificate.

In an embodiment, the secure boot ROM may process the digital certificate as follows: (i) verify that the certificate is authentic and the certificate has been signed by a trusted delegate of the root key owner; (ii) verify that the certificate is intended for the given device by comparing the device ID stored in the secure element NVM (non-volatile memory) registers and the code stored in the certificate to ensure that they match; and (iii) authenticate the firmware by regenerating its signature with the root public key and comparing the result with the value stored in the certificate. Only when the above three steps are successful, the SW that has been downloaded to the secure element RAM is verified and considered to be trustworthy. In an embodiment, the SW code in the external memory may be encrypted. In this case, it is first deciphered by the boot ROM. The SW encryption key (or a derivative) is stored in the secure element NVM registers and used directly by the ROM code.

Figure 5:
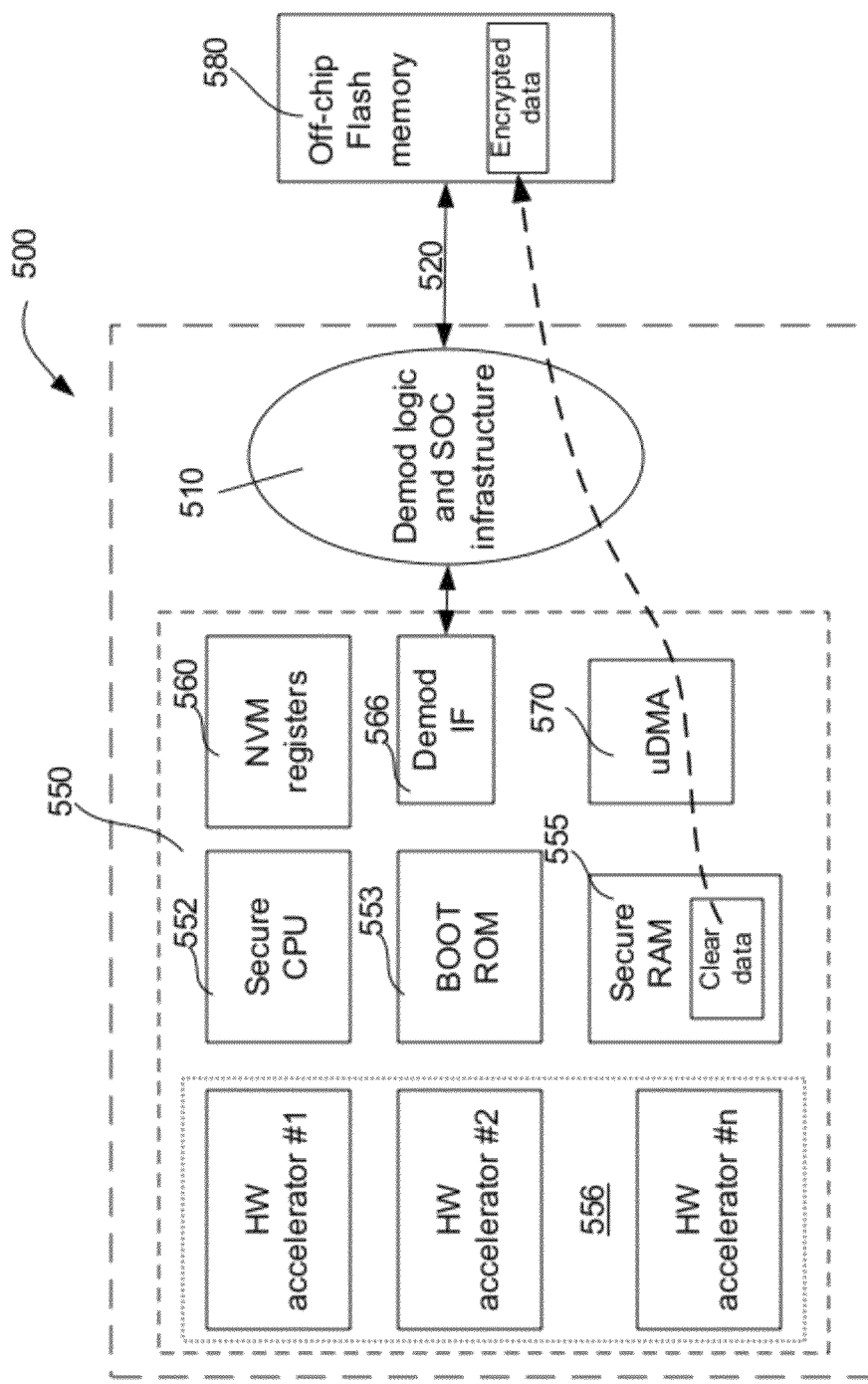
FIG. 5 is a simplified block diagram of an integrated secure element disposed in a demodulator SOC according to another embodiment of the present invention.

FIG. 5 is a simplified block diagram of an integrated secure element disposed in a demodulator SOC 500 according to an embodiment of the present invention. Demodulator SOC 500 includes a demodulation logic 510 that may have a similar configuration of the receiver 310 shown in FIG. 3. For example, demodulation logic 510 may include a tuner, a demodulator, a descrambler, a control CPU, a memory unit that comprises RAM and/or ROM, a host interface, and a control interface unit; the functions of those elements have been described in details in the sections above and won't be repeated herein for brevity reason. The demodulator logic 510 may further include system-on-a chip infrastructure such as registers, IO ports, one or more direct memory access controllers for interfacing with external storage devices, and other hardware and firmware. In an embodiment, a remote or external Flash memory 580 may be coupled to the demodulator SOC 500 through the demodulator logic 510 by means of a direct memory access controller (DMA) via a communication link 520.

Demodulator SOC 500 also includes an integrated secure element 550 that is coupled to the demodulation logic 510 by means of a demodulator interface 566. In an embodiment, integrated secure element 550 includes a secure CPU 552, a boot read-only memory (ROM) 553 containing a boot code that causes the secure CPU to download a firmware disposed in the external memory 580 and stores the firmware in a secure random access memory (RAM) 555. Integrated secure element 550 also includes a plurality of non-volatile memory registers 560 that are implemented using fuse cells that can be fabricated using standard CMOS processes, i.e., without the additional processing steps required for making EEPROM or Flash memory units of conventional secure elements. For example, the non-volatile memory registers are programmed (burned or blown) during the silicon manufacturing process to store information such as the device ID, the root public key, and others. Integrated secure element 550 further includes multiple hardware accelerators 556 that can be one or more crypto processors as described above in association with crypto hardware 356 of FIG. 3.

In accordance with some embodiments of the present invention, CA software, i.e., one or more sets of instructions provided to the secure CPU for execution, is stored in the secure RAM 555 to reduce hardware implementation cost. The CA software is dynamically downloaded from the remote (external) flash memory 580 to the RAM 555 ("RAM-ware") during the power cycle of the integrated secure element 550. Because the CA software is downloaded from the external Flash memory, it must be first authenticated by the integrated secure element 550. In an embodiment, the secure element operates a protocol to authenticate the RAM-ware using a public key algorithm and a digital certificate that is provided during the manufacturing of the demodulator SOC. In an embodiment, the authentication process can be assisted and accelerated using one or more hardware accelerators 556.

In an embodiment, CA software (used alternatively for firmware herein) is received by the demodulator logic from the external memory and transferred to the secure RAM 555 via a demodulator interface circuit 566. In contrast to conventional secure elements that store the CA software code in on-chip EEPROM and/or Flash memory, embodiments of the present invention provides a RAM-ware architecture that can be updated easily and securely (e.g., by reading in software codes stored in external memories). Because the RAM-ware architecture does not require EEPROM and/or Flash memory, it can be cost effectively produced using standard CMOS processes.

In an embodiment, the integrated secure element produces an attribute based on a digital certificate contained in the received software (now RAM-ware because it is now stored in the secure RAM) and provides the attribute to the demodulator logic for descrambling the received data streams (not shown). In some embodiments, the attribute can be a secure bit pattern or a secure codeword to enable the descrambling process in the demodulator logic 510.

In an embodiment, the integrated secure element 550 is activated when a TV application is enabled by the user. When the TV application is enabled, the demodulator logic 510 causes the boot ROM to execute the boot instructions and activate the integrated secure element. During the boot process, the conditional access (CA) firmware stored in the external flash memory is downloaded to the secure RAM disposed in the secure element 550.

As described above, the remote Flash memory contains conditional access (CA) software or firmware that is dynamically loaded to the RAM 555 disposed in the integrated secure element. In an embodiment, the external memory contains a digital certificate that is generated by the CA vendor or the demodulator SOC device manufacturer and signed with the root private key or a derivative of the root key using public key infrastructure (PKI). In an embodiment, the digital certificate may be unique to each demodulator SOC device and contains a device identification (ID) code. In an embodiment, the same identification code may also be stored in one or more of the non-volatile memory registers 560. In an embodiment, the non-volatile memory registers 560 may also store a digital signature of the CA software or CA firmware. In an embodiment, the boot ROM authenticates the firmware using the digital certificate.

In accordance with some embodiments of the present invention, as shown in FIG. 5, external flash memory 580 is used to back up (copy) the data stored in the secure RAM during the execution of the CA software. The backup operation may be triggered in response to any number of events, such as (i) when recurring timers force a periodic backup; (ii) when a specific data set is modified, based, for example, on the secure firmware state-machine and key provisioning; or (iii) upon a power-off cycle when an off condition is detected or requested by the host. In other embodiments, the backup operation can be dynamically user driven or based on other criteria.

Referring to FIG. 5, integrated secure element 550 includes a direct memory access (DMA) controller 570 coupled to secure RAM 555. DMA controller 570 is a hardware feature that enables movement of blocks of data from peripheral to memory, memory to peripheral, or memory to memory with minimal involving of the secure CPU. In an embodiment, the DMA controller can also be used to move data in parallel with the CPU. In some embodiments, the DMA controller retrieves the clear data stored in the secure RAM and writes it to an external memory port that can reside in the integrated secure element (shown as external memory interface 368 in FIG. 3, memory port interface 420 in FIG. 4, or communication link 520 in FIG. 5). The DMA controller manages the flow of data in and out of the secure element 550. In some embodiments, the DMA controller operations can be performed by secure CPU 552.

In an embodiment, the clear data stored in the secure RAM is encrypted using an encryption key before being backing up. The encryption key can be from a private key security system, where the integrated secure element 550 and the external memory 580 share a "private" key for encrypting and decrypting data passing between them. In an embodiment, the encryption key can be from a public key system, where the secure element has a key pair that consists of a private key and a public key, wherein both keys are used to encrypt and decrypt data, and the private key is only known to the integrated secure element, and the public key is available to many other devices.

Figure 6:
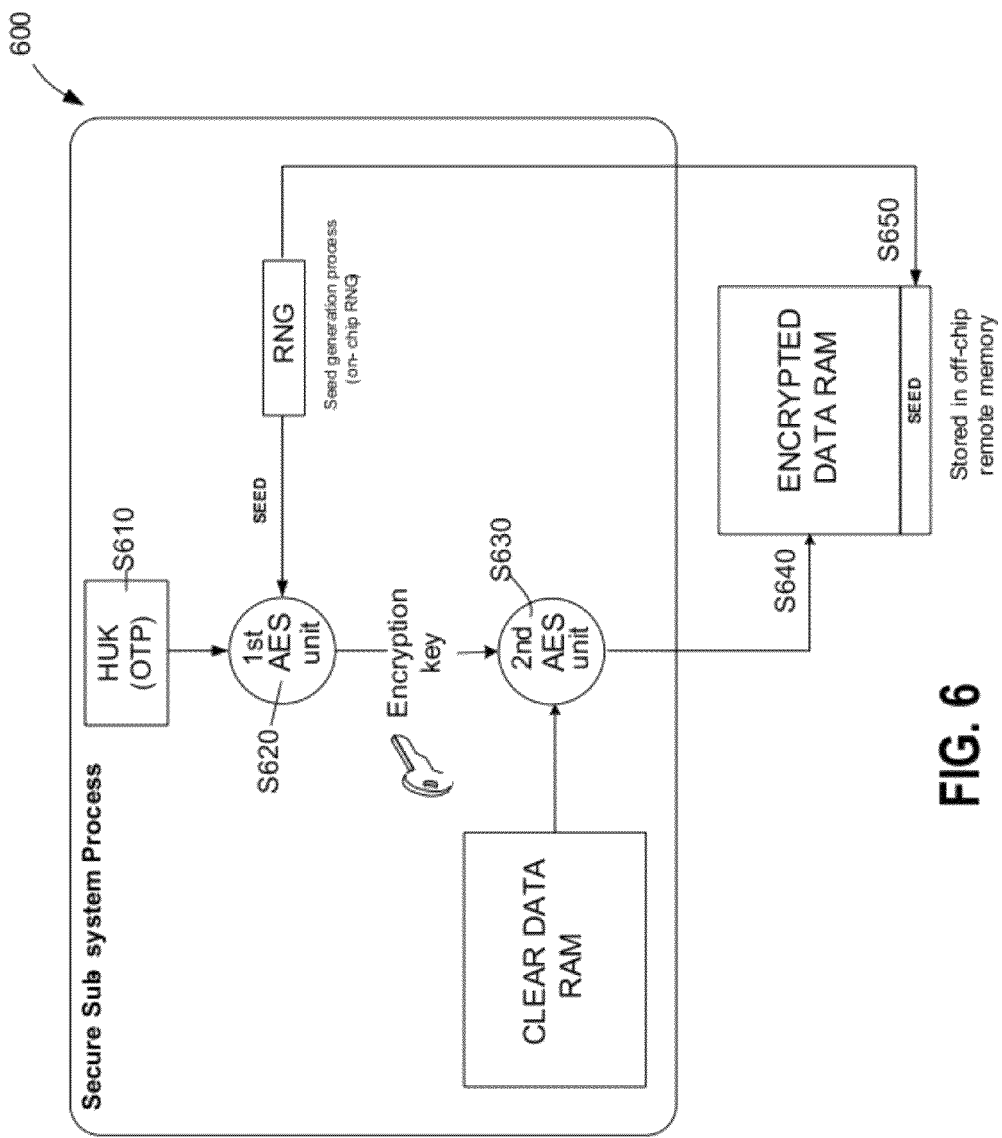
FIG. 6 is an exemplary process for generating an encryption key according to an embodiment of the present invention.

FIG. 6 is an exemplary process 600 for generating an encryption key and for outputting encrypted data to an external memory according to an embodiment of the present invention. At step S610, a hardware unique key (HUK) that is stored in one of the non-volatile memory registers is provided to a first AES unit. The AES unit can be one of the HW accelerators 556 performing known encryption algorithms, such as AES, DES/3DES, RSA algorithms, and others. At step S620, the first AES unit processes the HW unique key with a SEED value (i.e., binary data), which may be a preset value or it can be a random number set by the secure CPU or by a on-chip random number generating unit. The seed value or the random number, can be generated from an on-chip random number generator (e.g., one of the HW accelerators) in an embodiment of the present invention. An encryption key is then generated and provided to a second AES unit. The second AES unit processes the clear data stored in the secure RAM with the encryption key at step S630 according to an encryption algorithm and produces encrypted data. In an embodiment, the first AES and second AES units can be a same AES unit. In another embodiment, they may be individual units. At step S640, the encrypted data is written to the external memory in a backup event. The backup event may be triggered by a user, by software, in the event of an overvoltage or under voltage supply, light emitting sensors, periodically set by a timer, and others. In an embodiment, the seed value (random number) is also written to the external memory at a predetermined location (step S650).

Figure 7:
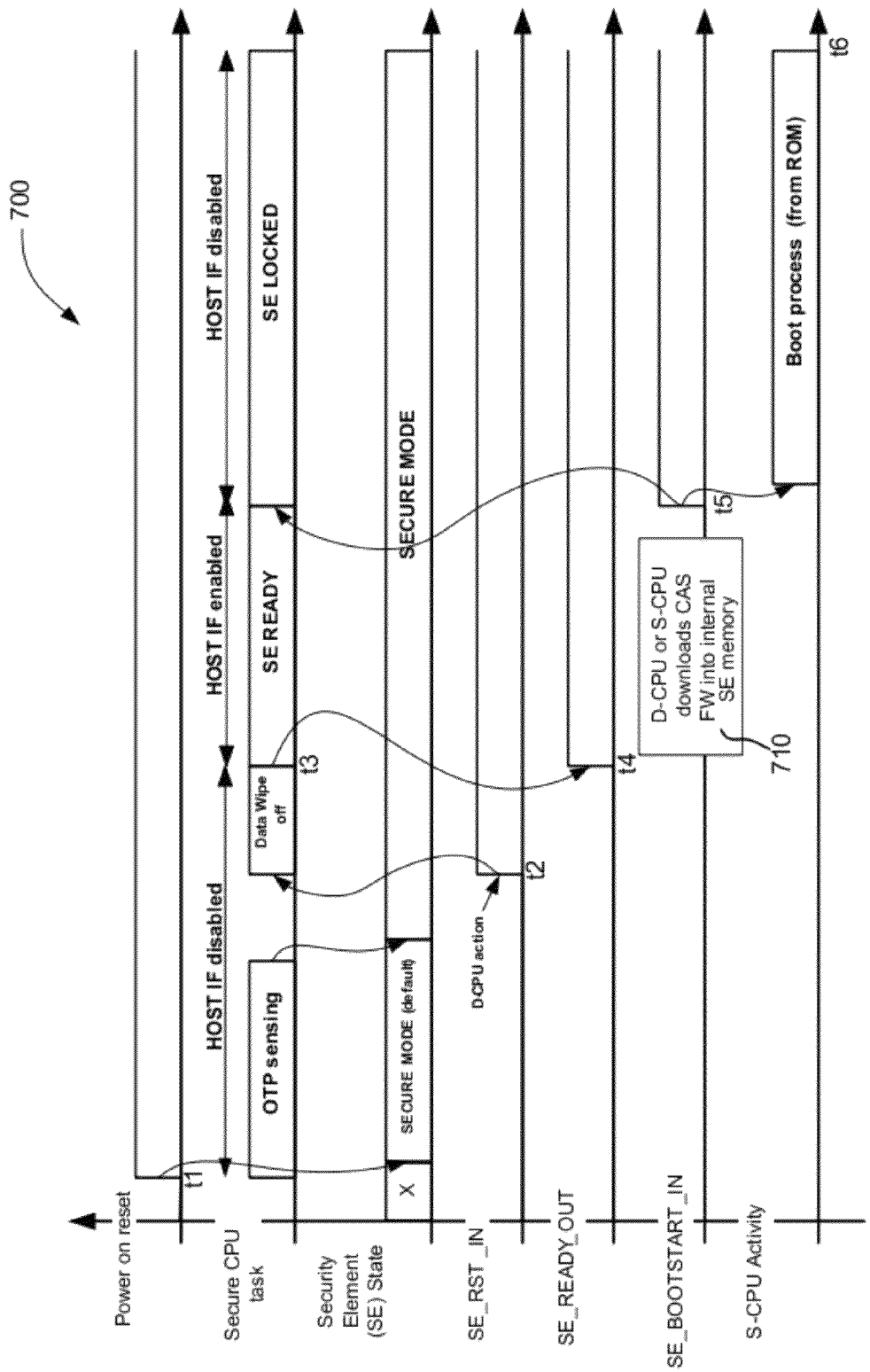
FIG. 7 is a simplified timing diagram illustrating a startup operation of a demodulator SOC according to an embodiment of the present invention.

FIG. 7 is a simplified timing diagram illustrating a startup operation 700 of a demodulator SOC according to an embodiment of the present invention. The timing diagram is described with respect to FIG. 4. The startup sequence begins with the application of system power at a time period before t1 where the demodulator SOC remains in a reset mode. When all voltages reach acceptable operating levels, the power supply may send a power-good signal to the demodulator SOC. Upon completion of a power-on-reset at time t1, the secure element is in the default secure mode, and the host interface is disabled. The secure CPU updates the working registers with values stored in associated non-volatile memory registers (indicated as OTP sensing in FIG. 7). The integrated secure element is in the secure mode (the default mode) while the secure CPU updates its working registers. At time t2, the power-on-reset deassertion of the secure element takes place to set the demodulator in action (indicated by going high at "D-CPU action") and initiates the data wipe off of the secure RAM (indicated as 'Data Wipe Off'). At time t3, upon the wipe-off (erasure) of the secure memory (i.e., setting the RAM content to all "0" or "1"), the secure element signals to the demodulator that the secure memory is ready for data (firmware) download (at time t3), the host interface is also enabled at that time, the secure element signals its readiness by outputting an SE_READY_OUT (indicated as going high at time t4). The download process (i.e., fetching of CAS firmware from external memory) may start and the firewall, it present, is open to allow firmware download from an external memory. Upon the download completion, the secure CPU can start the boot-up process at time t5, the secure element is now locked, the firewall, if present, is locked, and the host interface is disabled while the secure element initiates the boot process by means of the boot ROM (this boot process is indicated in the last row in FIG. 7). This diagram is merely an example, which should not unduly limit the scope of the claims. One of ordinary skill in the art would recognize many variations, alternatives, and modifications. For example, FIG. 7 shows that the demodulator D-CPU reads data of the remote (external) Flash memory and writes to the on-chip secure memory (indicated as a box 710). In an alternative embodiment, the secure CPU may reads data from the remote Flash memory and writes the data to the secure memory. In any event, the secure element is locked to prevent the demodulator from accessing the secure random access memory and the read-only memory. If the data stored in the random access memory is deemed to be authentic or valid in the boot process, the secure element will executes the data upon completion of the boot process. If the data is deemed to be not authentic, then the secure element may remove the data from the random access memory. Details of the validation and authentication will be described in detail below.

Figure 8:
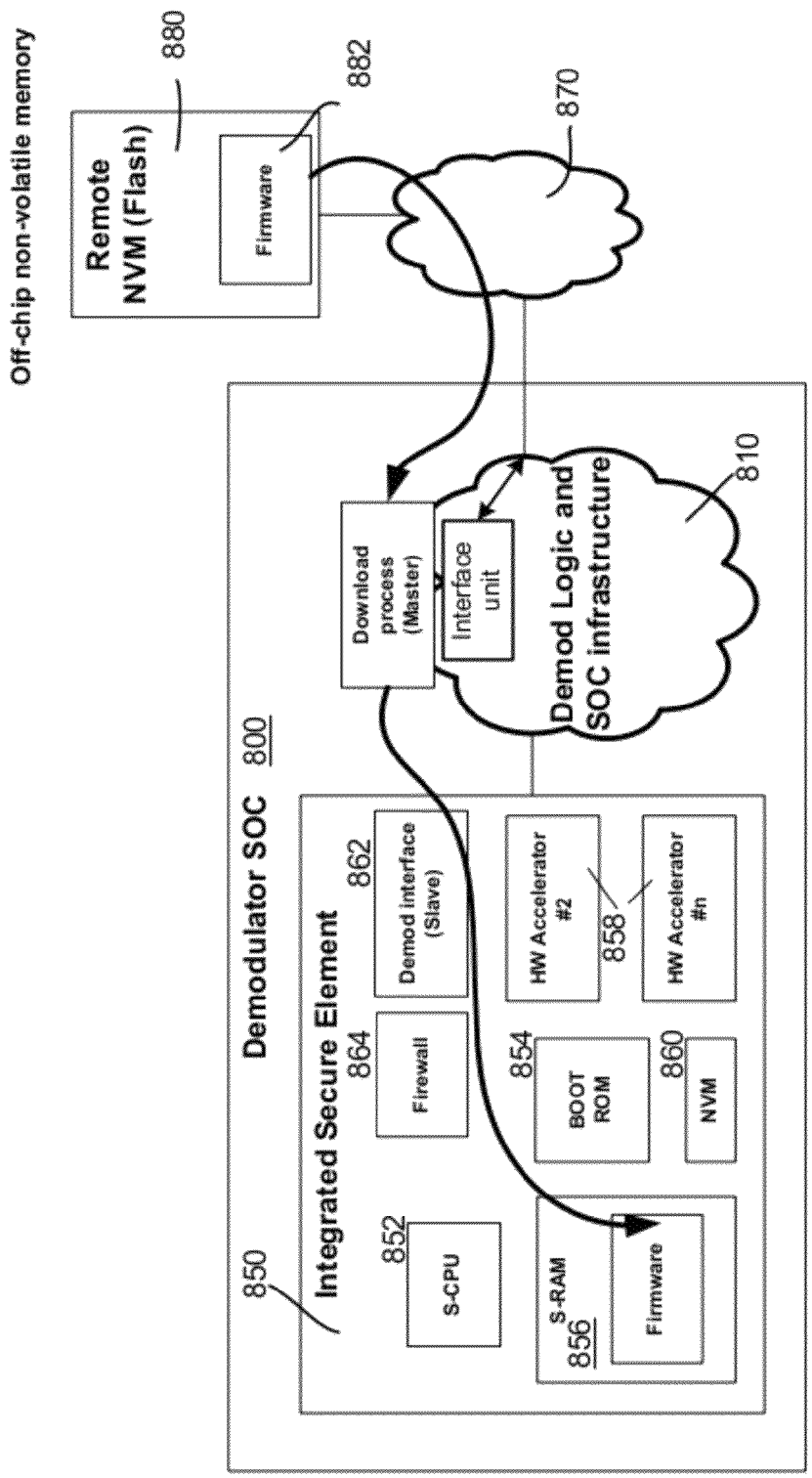
FIG. 8 is an exemplary demodulator SOC that executes a data download operation from an external memory according to an embodiment of the present invention.

FIG. 8 illustrates a demodulator SOC 800 performing a firmware image download operation from an external memory according to an embodiment of the present invention. Demodulator SOC 800 comprises a demodulator logic 810 and an integrated secure element 850. Demodulator logic 810 may include a tuner, a demodulator, a descrambler, control CPU, a memory unit, a host interface as shown in FIG. 3. The demodulator logic may include SOC infrastructure having one or more IO ports, a memory interface unit, and others. In an exemplary embodiment, the SOC infrastructure may include an interface unit 812 such as a USB, a peripheral computer interface (PCI), a SD (secure digital) interface, or a communication link for interfacing with an off-chip non-volatile memory 880. In a specific embodiment, the interface unit 812 may establish a connection to the remote memory via a short distance physical connection by means of a USB connector, an SD connector, or the like. In another embodiment, the interface unit 812 may coupled to the remote memory 880 via a local area network, a personal area network (Bluetooth) or a wireless area network according to the IEEE802.11 standard or the like (the local, personal, or wireless area network is indicated as a cloud 870).

The integrated secure element includes a secure CPU 852 that together with a boot ROM 854 initiates the integrated secure element at power up. The secure element further includes a secure static random access memory (S-RAM) 856, one or more hardware accelerators 858, one or more non-volatile memory (NVM) registers or fuses (one-time programmable) 860, and a slave demodulator interface circuit 862 that couples the integrated secure element 850 with the demodulator logic 810.

The secure element may include a firewall 864 that allows for the secure CPU to initiate a connection to the remote memory 880 and download firmware (i.e., data files, executable applications) 882 from the remote memory to the secure S-RAM 856, but does not allows the remote memory to initiate a connection in the reverse direction.

Upon wiping off the content of the secure S-RAM at time t3 (FIG. 7), the demodulator SOC initiates a download of the firmware. The download process can be performed by the demodulator CPU D-CPU by means of the hardware master port to fetch a firmware from remote flash memory 880 and write the fetched firmware to the secure S-RAM using the slave port interface 862. However, this read-and-write of the CA firmware from the remote flash memory cannot be considered as secure because the demodulator logic 810 and the remote flash memory 880 are outside of the secure element boundary. Therefore, the downloaded firmware in the secure S-RAM must be authenticated to protect the firmware from modification. Once the firmware download is complete, the secure element locks the slave interface firewall to prevent any subsequent access from the non-trusted demodulator interface (indicated as "SE LOCKED" in FIG. 7) and the secure S-CPU may start executing from the boot ROM (indicated as "Boot process (from ROM)" in the last row "S-CPU Activity" of FIG. 7). It is noted that the demodulator logic cannot access the secure element through the master-slave demodulator interface 862 once the security element is locked.

The timing diagram of FIG. 7 is summarized as follows: Prior to time t1, the demodulator SOC is in a power-on reset mode. At time t1, all required voltage supplies reach their operating levels. Between time interval t2 and t3, the secure element updates registers with data from their associated non-voltage memory registers ("OTP sensing"). The content of the secure static RAM is erased during that time ("Data Wipe off"). During time interval between t4 and t5 (indicated by box 710), the firmware image of the remote flash device 880 is downloaded to the secure static RAM. Upon the download completion, the secure element is in a locked mode so that no communication between the demodulator logic 810 and the secure element 850 is possible. The secure element executes the boot process including the authentication of the firmware image during time interval between t5 and t6. Upon a successful authentication of the firmware image, the secure element may now initiate the firmware and a normal operation may start at time t6. If the authentication process is not successful, the secure element may disable or remove the firmware stored in the static random access memory.

Figure 9:
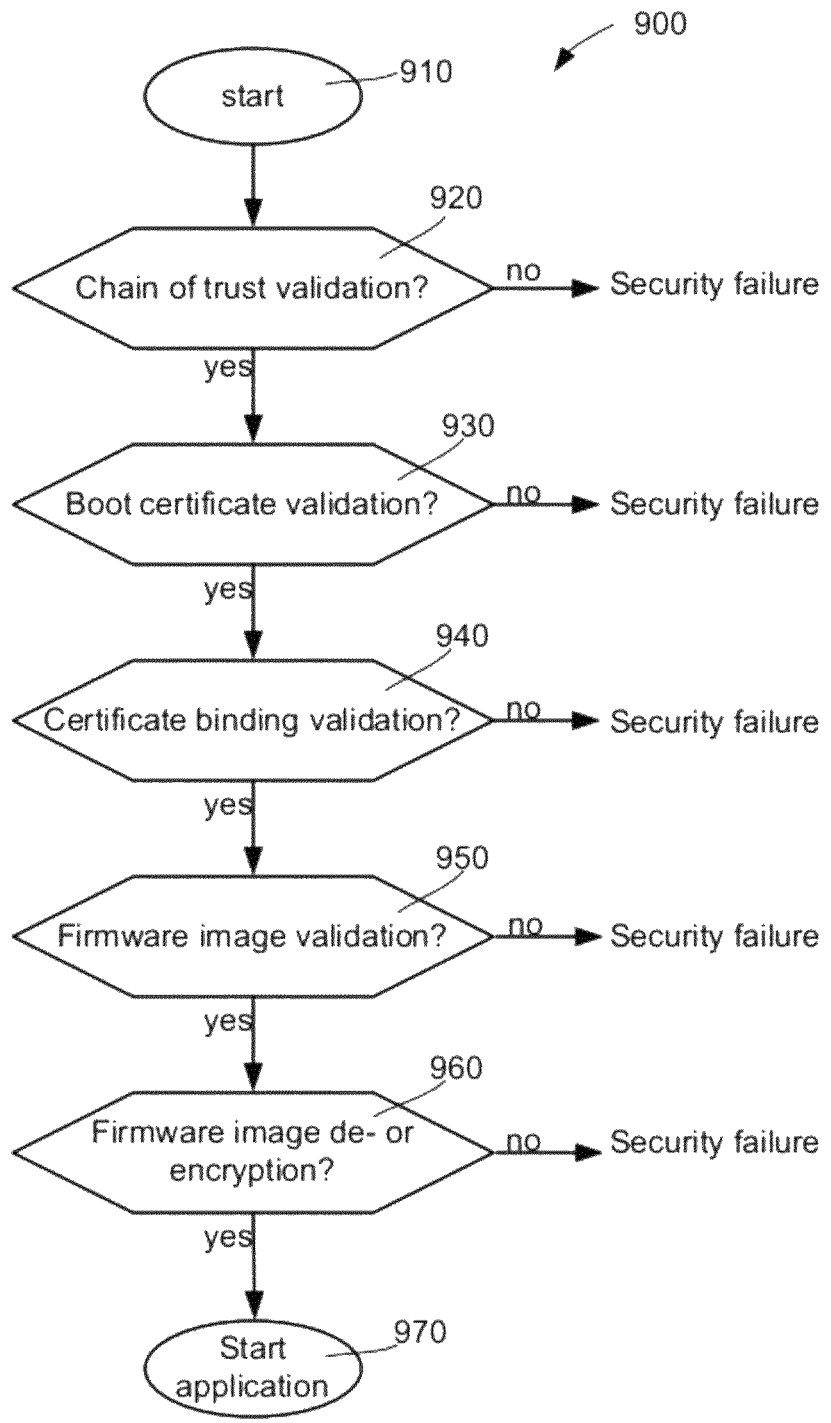
FIG. 9 is a simplified flow chart diagram illustrating a boot loader process according to an embodiment of the present invention.

FIG. 9 is a simplified flow chart diagram illustrating a boot loader process 900 according to an embodiment of the present invention. Boot loader process 900 includes a multiple-step sequence and may be implemented in multiple phases. This diagram is merely an example, which should not unduly limit the scope of the claims. One of ordinary skill in the art would recognize many variations, alternatives, and modifications. In a specific embodiment, the boot loader process begins at start (step 910) with the application of supply voltages to the demodulator SOC and the subsequent removal of power-on-reset of the various hardware reset configurations as described with regard with the startup operation shown in FIG. 7. The boot ROM as shown in FIG. 8 includes a boot loader so that the secure CPU 852 can subsequently perform a boot sequence on its own once the firmware image is written into the secure RAM. As described above, the firmware image can be downloaded using the interface unit 812 that may include asynchronous or synchronous memory interface such as SRAM, PSRAM, or DRAM interface. In an embodiment, the asynchronous or synchronous memory interface may couple with a variety of peripherals, such as Ethernet, SD (secure digital) card or MMC (multimedia card), a USB or a wireless connection. Upon the completion of the downloading of the firmware from the remote memory 880 to the secure memory 856, the integrated secure element starts a series of validations that includes a chain of trust validation at step 920, a boot certificate validation (step 930), a certificate binding validation (step 940), a firmware image validation (step 950), and a firmware image decryption (960) if the firmware image is encrypted. In the event that the secure element completes the series of validations successfully, the firmware is considered valid, the secure element will switch execution control to the secure S-RAM 856 and begins the executable applications stored in the S-RAM (step 970). In the event that the validation is unsuccessful, the content of the secure S-RAM may be flushed and the operation is terminated (indicated by the "no" in each validation shown in FIG. 9). Each of the validations is described in detail below.

In an alternative embodiment, the boot loader process may authenticate the firmware image from the external memory prior to writing the firmware image to the secure S-RAM. The authentication may be performed using a public key infrastructure (PKI) and a digital certificate. The boot process authenticates the digital certificate and binds the public key to the device. The boot process may also decipher the firmware image if it is encrypted.

Figure 10:
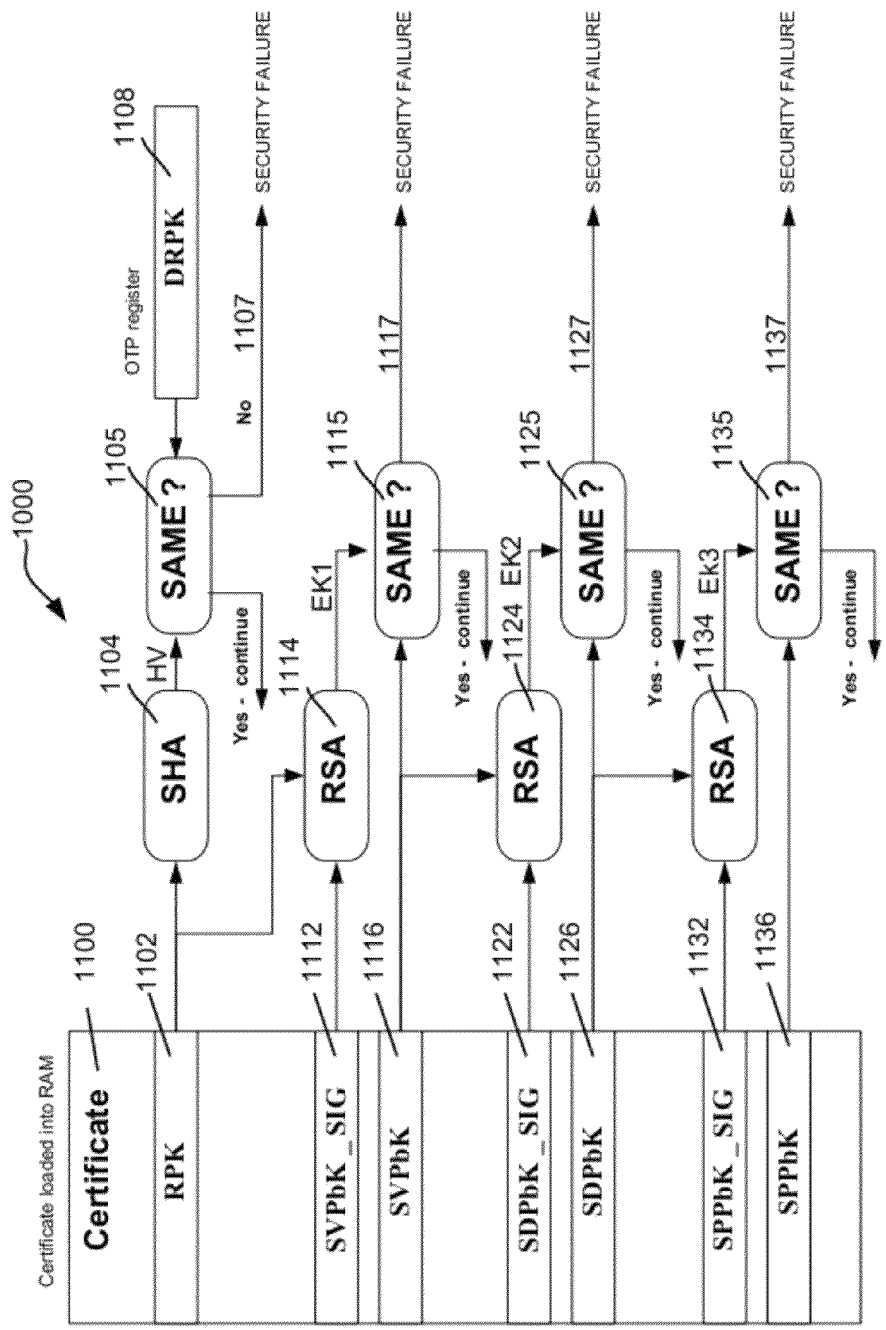
FIG. 10 is an exemplary diagram illustrating a chain of trust validation having four-layer RSA public/private keys according to an embodiment of the present invention.

FIG. 10 is an exemplary diagram illustrating a chain of trust validation 1000 having four-layer RSA public/private keys according to an embodiment of the present invention. In an embodiment, a certificate 1100 that is to be loaded to the secure S-RAM includes a root public key 1102. The secure element performs a hash algorithm 1104 on the root public key to obtain a hash value HV and compare (1105) the obtained hash value HV with a digest root public key (or full key) 1108 that is stored in a non-volatile memory register (shown as NVM block 860 in FIG. 8). If the validation is negative, the secure element will stop the chain of trust validation (1107). If the comparison is positive, the chain of trust validation continue to a first RSA operation 1114. First RSA operation 1114 performs a first RSA algorithm on the root public key RPK 1102 and a software vendor public key signature SVPbK_SIG 1112 to obtain a first RSA value EK1 and compares (operation 1115) the RSA value EK1 with a software vendor key SVPbK 1116. If the comparison is negative (1117), the secure element stops the validation operation. If the comparison 1115 is positive, the secure element will continue a second RSA operation 1124. Second RSA operation 1124 performs a second RSA algorithm 1124 on the software distribution public key SVPbK 1116 and a software distribution public key signature SDPbK_SIG 1122 to obtain a second RSA value EK2 and compares (operation 1125) the second RSA value EK2 with a software distribution public key SDPbK 1126. If the comparison is negative (1127), the secure element stops the validation operation. If the comparison 1125 is positive, the secure element continues to perform a third RSA operation 1134. Third RSA operation 1134 perform a third RSA algorithm 1134 on the software distribution public key SDPbK 1126 and a software personalization site key signature SPPbK_SIG 1132 to obtain a third RSA value EK3 and compares the third RSA value EK3 with a software personalization public key SPPbK 1136. If the result of the comparison is negative (1137), the secure element stops the chain of trust validation. If the result of the comparison is positive, the secure element will continue to the boot certificate validation. It is appreciated that the RSA operation means a public key cryptographic operation.

For the purposes of the present invention, root public key RPK 1102 is at the highest level in the boot loader process. All other keys are derived and signed from the root public key. The digest of the root public key DRPK or full key 1108 is stored in the OTP (onr time programmable memory, i.e., the non-volatile memory register 860 of FIG. 8) or hardcoded in hardware. Software vendor key SVPbK 1116 is a dedicated CAS software vendor key, where vendor may refer to a service provider, a network operator, a device manufacturer, or other entity that may want to use the demodulator SOC. Software distribution key SDPbK 1126 is a sub-key offered for flexibility of the software signing process to further discriminate the distribution channels (e.g., by region, by customers, by volume, etc.). Software personalization site SPPbK 1136 is a sub-key to identify the physical personalization site or machine used to package the main certificates and firmware. Each sub-key is associated with a digital signature that is the corresponding public key encrypted with the higher level private key (e.g., SVPbK_SIG is the RSA result of SVPbK and RPK). It is understood that the certificate 1100 and the root public key 1102, software vendor public key code (or signature) 1112, software public key 1116, software distribution public key code 1122, software distribution public key 1126, software personalization site code 1132, and software personalization public key 1136 are part of the data and executable codes or applications that need to be loaded to the secure S-RAM.

The chain of trust validation provides numerous security benefits such as verifying that all sub-keys can be verified against the digest root public key (or full key) stored in the non-volatile memory or tamper-proof register of the demodulator SOC device. The other benefits include establishing a root of trust between the software personalization site public key in the certificate and the device: The certificate loaded in the secure memory belongs to the same chain of trust as the hardware device itself.

Figure 11:
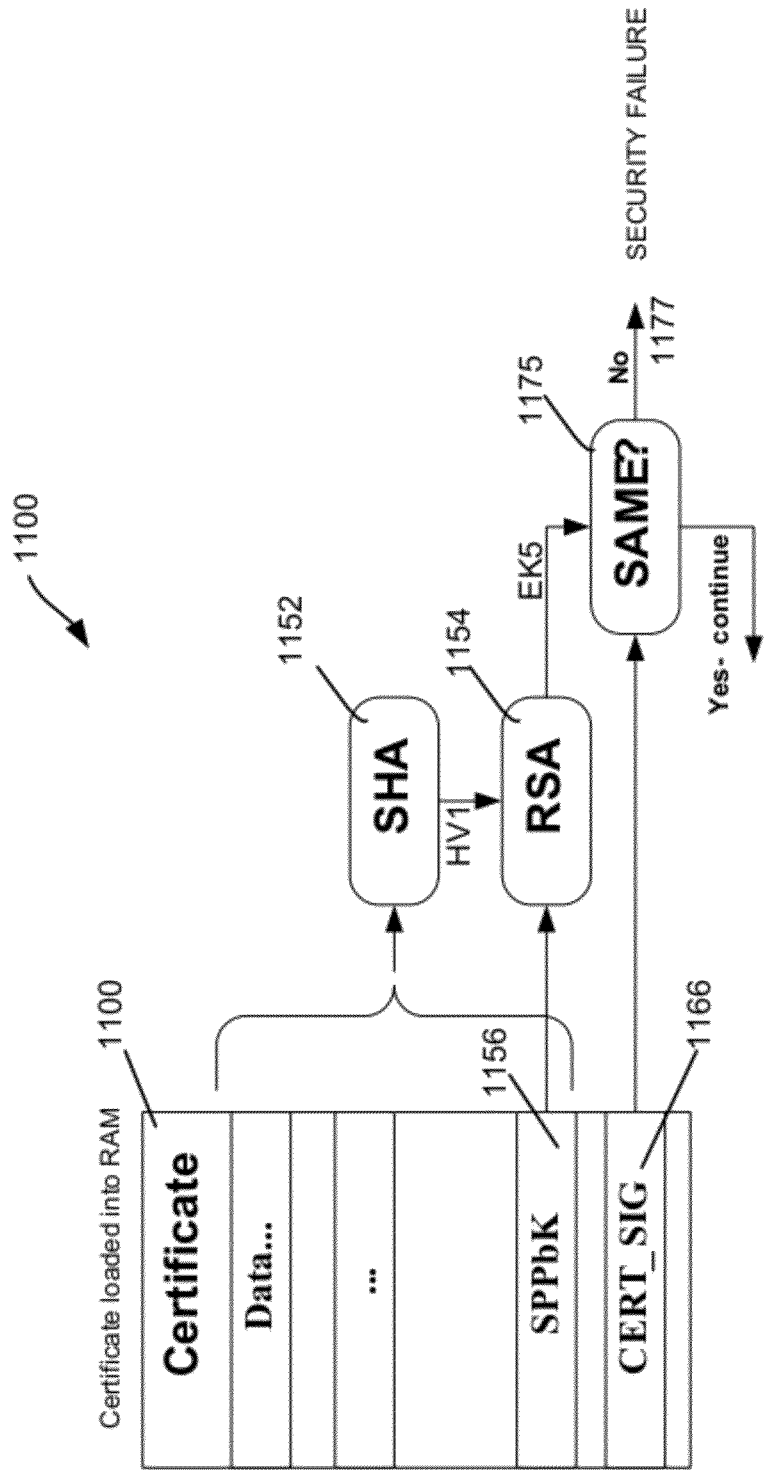
FIG. 11 is a simplified diagram illustrating a boot certificate validation according to an embodiment of the present invention.

FIG. 11 is a diagram illustrating a boot certificate validation 1100 according to an embodiment of the present invention. Boot certificate validation 1100 verifies that the certificate content can be trusted and has not been altered and establishes a legitimate relationship between the content and the software personalization site public key. Boot certificate validation 1100 comprises hashing (1152) the certificate 1100 including the software personalization site private key SPPvK 1156 to obtain a hash value HV1 and performing an RSA function (1154) on the HV1 and the software personalization private key SPPvK 1156 to generate an RSA value EK5. Boot certificate validation 1100 further includes validating the certificate content by comparing (1176) the RSA value EK5 with a certificate signature CERT_SIG 1166. If the comparison is negative (1177), the secure element stops the boot loader process. If the comparison 1175 is positive, the secure element continues to step 940 of the boot loader process, which is the certificate binding validation.

Figure 12:
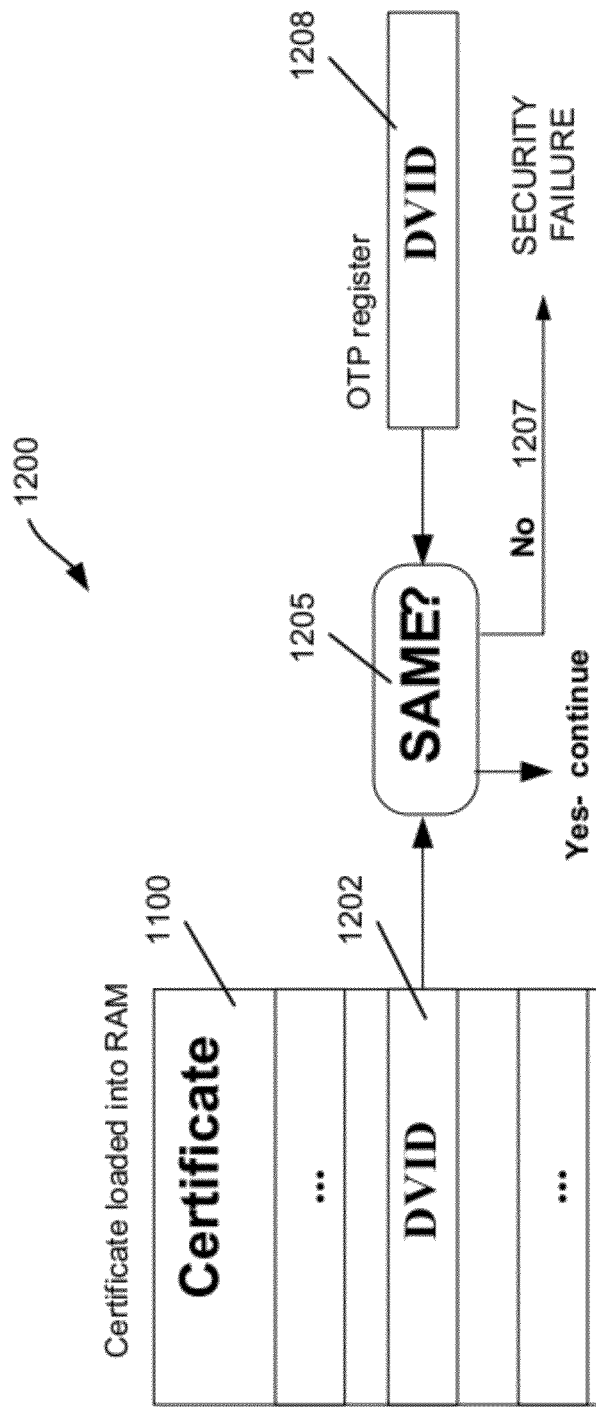
FIG. 12 is a simplified diagram illustrating a certificate binding validation according to an embodiment of the present invention.

FIG. 12 is a diagram illustrating a certificate binding validation 1200 according to an embodiment of the present invention. Certificate binding validation 1200 verifies that the loaded certificate is intended for the given device and has not been duplicated or copied on another hardware platform. Certificate binding validation 1200 includes comparing the device identification DVID 1208 stored in the OTP or tamper-proof register (NVM register 860 of FIG. 8) with a value 1202 stored in the digital certificate 1100 that has been verified for authenticity in previously validations. If the result of the comparison is negative (1207), the secure element stops the boot loader process. If the comparison 1205 is positive, the secure element continues to step 950 of the boot loader process, which is the firmware image validation.

Figure 13:
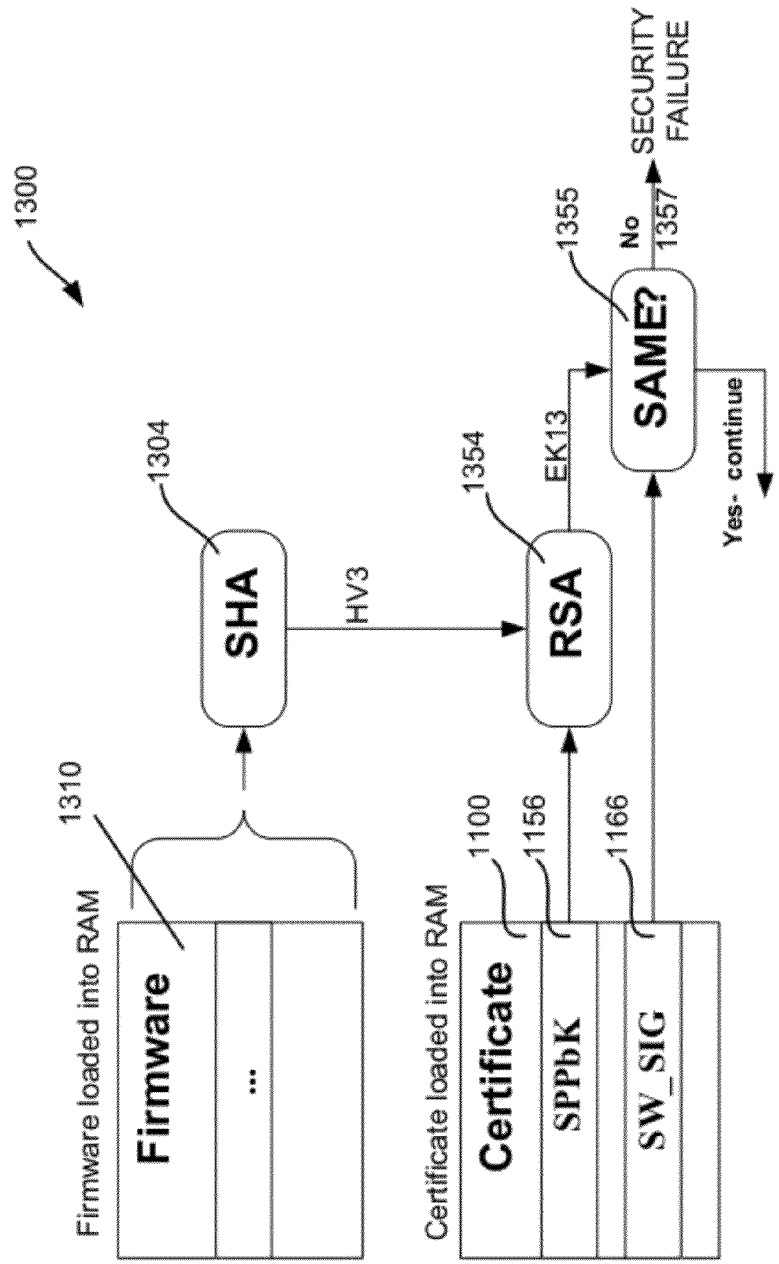
FIG. 13 is a simplified diagram illustrating a firmware image validation according to an embodiment of the present invention.

FIG. 13 is a diagram illustrating a firmware image validation 1300 according to an embodiment of the present invention. Firmware image validation 1300 verifies that the entire firmware image has not been altered and is issued from the same chain of trust as the boot certificate. Firmware image validation 1300 executes a hash algorithm 1304 on the firmware image 1310 and obtains a hash value HV3. An RSA operation is further performed on the obtained hash value HV3 and the software personalization site PPPbk 1156 to generate an RSA value EK13. The generated RSA value EK13 is then compared (1355) with the obtained hash value HV3. If the result of the comparison is negative, the secure element will stop the boot loader process (1357). If the result of the comparison is positive, the secure element may continue the boot loader process at step 960, which is a firmware image decryption.

In some embodiments, firmware may be encrypted for confidentiality requirements. The secure element may use one of the following encryption/decryption methods for deciphering firmware: 1) using a symmetric encryption of a software encryption key that is generated from the hardware unique key, which is stored in one of the NVM registers, or 2) and using an asymmetric encryption of a software encryption key with a private/public key pair for which the private key is stored in one of the NVM registers and the public key is used for encryption of the software encryption key that is stored in the digital certificate.

Figure 14A:
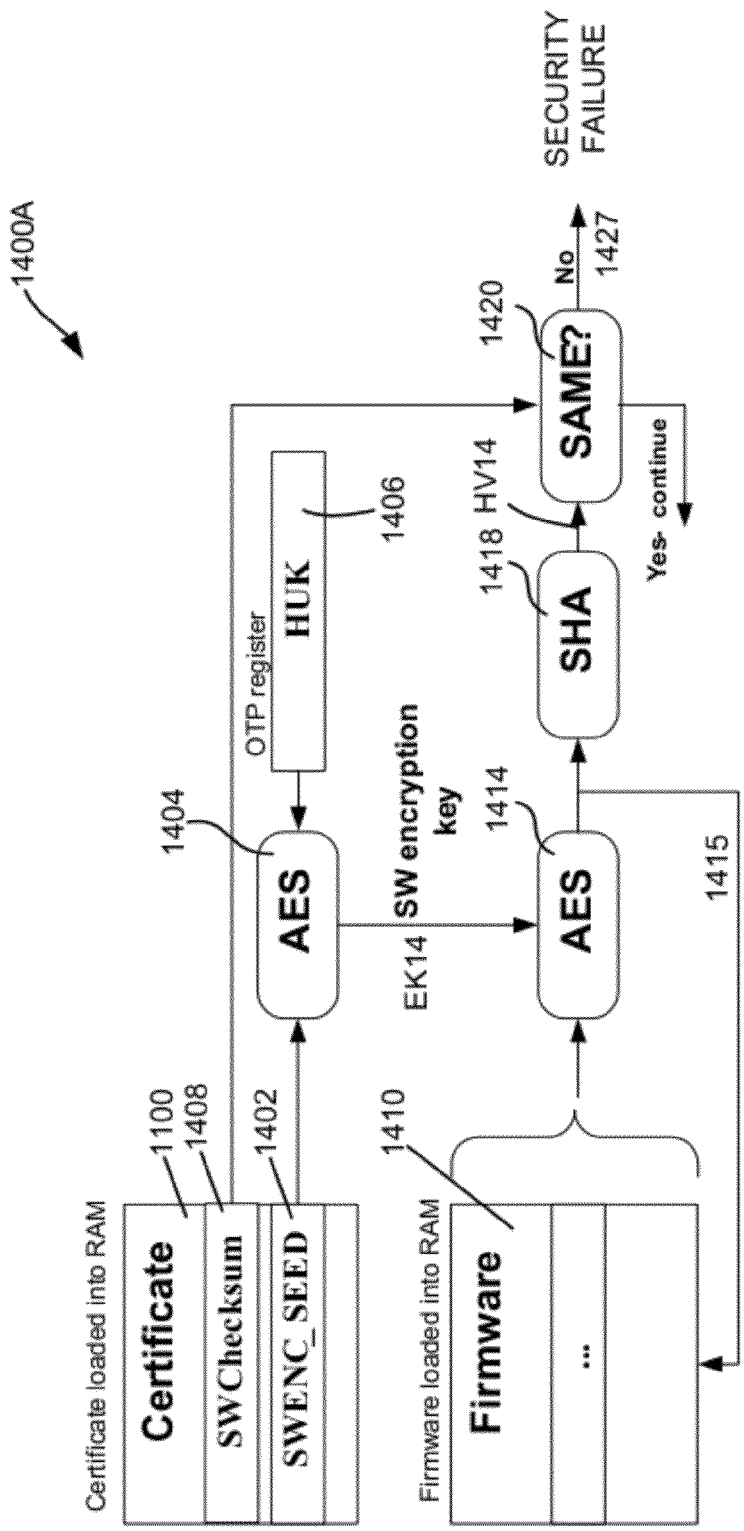
FIG. 14A is a simplified diagram illustrating a firmware image decryption (deciphering) according to an embodiment of the present invention.

FIG. 14A is a diagram illustrating a firmware image decryption (deciphering) 1400A according to an embodiment of the present invention. The secure element performs a symmetric key encryption 1404 on a software encoded seed value 1402 (which is disposed in the digital certificate 1100) and a hardware unique key 1406 (which is stored in one of the fuse banks, NVM or OTP registers 860 of FIG. 8). The generated encryption key EK14 is used in a second encryption process 1414 for decrypting firmware image 1410 if it has been previously encrypted. The decrypted firmware image 1415 is then stored in the secure memory. The decrypted firmware image is further provided to a hash process 1418 to obtain a hash value HV14 that is compared with a software checksum 1408 embedded in the certificate 1100. If the result of the comparison 1420 is negative, the secure element will abort the boot loader process. If the result of the comparison is positive, the secure element starts the applications at step 970.

Figure 14B:
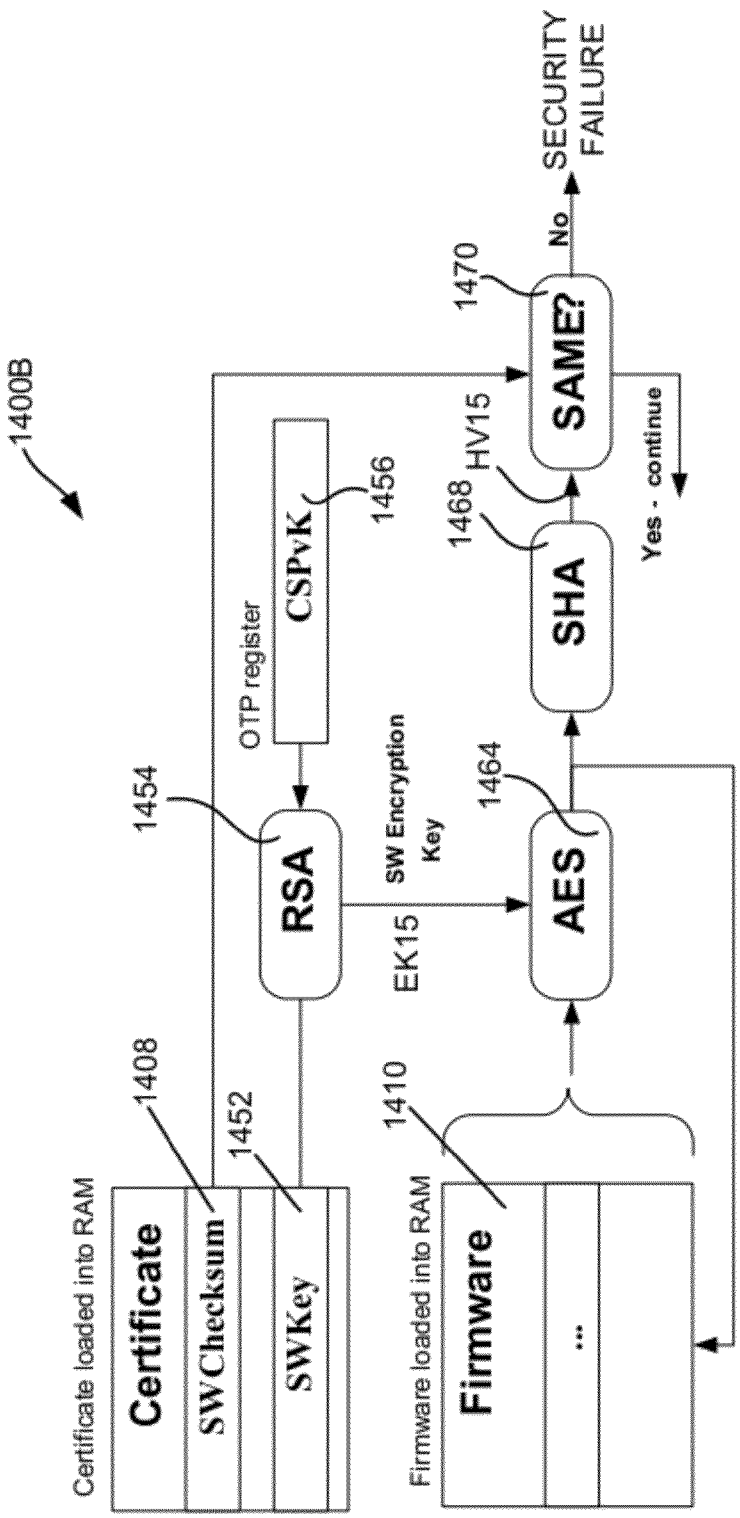
FIG. 14B is a simplified diagram illustrating a firmware image decryption (deciphering) according to an alternative embodiment of the present invention.

FIG. 14B is a diagram illustrating a firmware image decryption (deciphering) 1400B according to an alternative embodiment of the present invention. The secure element performs a first encryption operation 1454 on the software key SWkey 1452 and a private key CSPvK 1456 stored in the NVM or OTP register. The generated software encrypted key EK15 is then used in a second encryption operation 1464 to decrypt the firmware image 1410. The decrypted firmware is stored in the secure S-RAM and also provided to a hash operator 1468 to obtain a hash value HV15. The obtained hash value HV15 is compared with the software checksum 1408. If the result of the comparison 1470 is negative, the secure element will abort the boot loader process. If the result of the comparison is positive, the secure element starts the applications at step 970.

The foregoing description of the code download and boot loader process is not intended to be exhaustive and to limit the scope of the invention to the precise disclosed order and form. For example, although the boot loader process has been described having several sequential steps of validations and firmware image decryption as the last step after the validation. The boot loader process may begins with decryption of the firmware in an embodiment. The boot loader process may also perform in parallel instead of sequentially.

Figure 15:
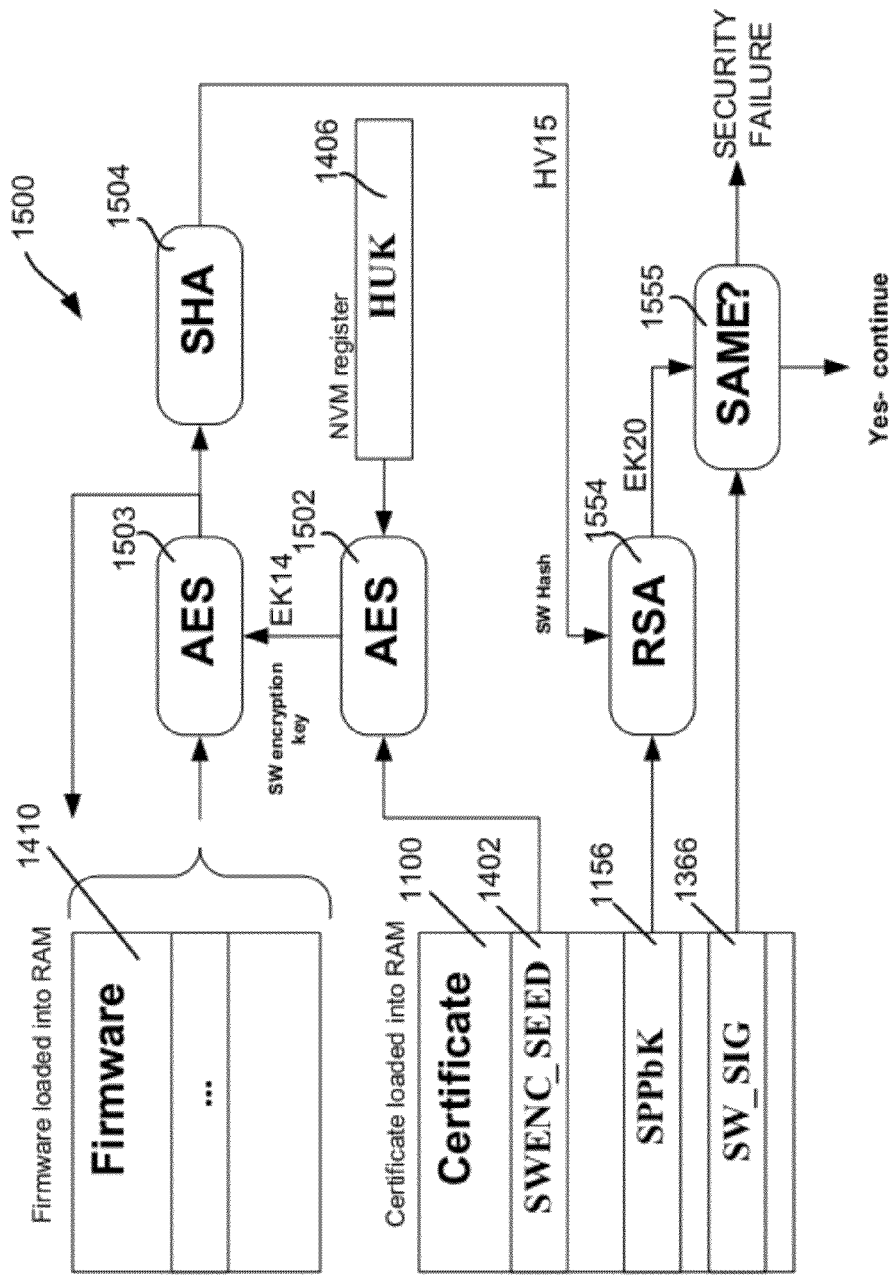
FIG. 15 is a simplified diagram illustrating a one-step firmware decryption and authentication process according to an embodiment of the present invention.

FIG. 15 is a diagram illustrating a one-step firmware decryption and authentication process 1500 according to an embodiment of the present invention. The one-step firmware decryption and authentication process includes a first encryption process 1502 that can be performed for example by one of the hardware accelerators 858. First encryption process 1502 generates an encryption key EK14 from a SWENC_

SEED 1402 disposed in the certificate 1100 and the unique identifier HUK 1406 disposed in the NVM register. Software encryption key EK14 is then provided to a second encryption process 1503 that uses the encryption key EK14 to decipher the firmware image 1410. The deciphered or decrypted firmware image is then hashed to obtain a hash value HV15. An encryption engine RSA 1554 (e.g., one of the hardware accelerators 858) operates on the hash value HV15 and a software personalization site key SPPbK 1156 to produce an encryption value EK20 that is compared with a software signature SW_SIG 1366. In the event that the comparison 1555 produces a match, the secure element starts the applications (the firmware image). In the event that the comparison is negative, the secure element stops the authentication process and may flush the firmware image 1410 (data and applications files) stored in the secure memory. Note that the firmware image and the certificate can be authenticated in one validation step.

Figure 16:
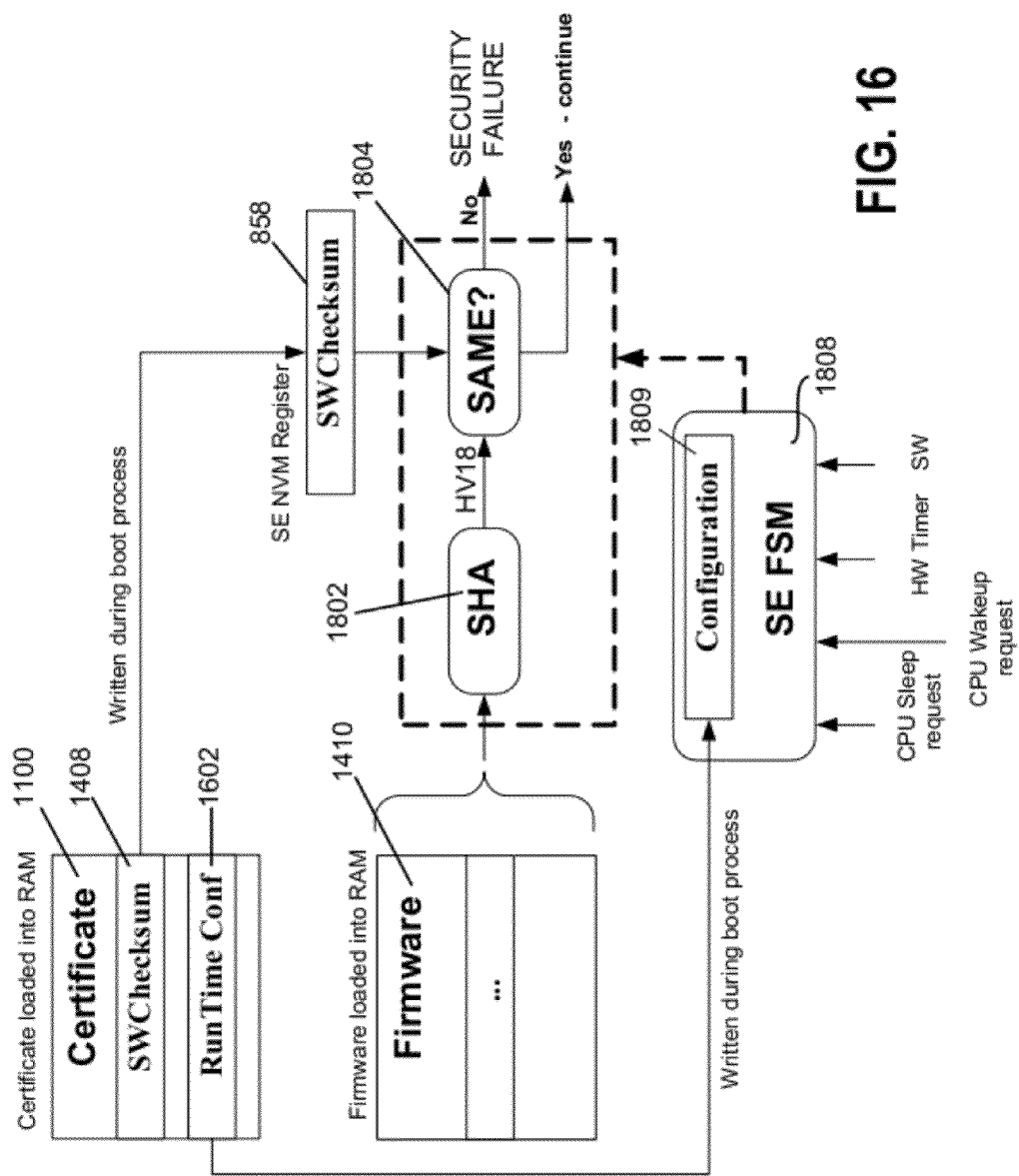
FIG. 16 is a simplified diagram illustrating a firmware run-time authentication using hardware facilities provided by the secure element according to an embodiment of the present invention.

FIG. 16 is a diagram illustrating a firmware run-time authentication using hardware facilities provided by the secure element according to an embodiment of the present invention. The firmware run-time authentication provides an efficient way to mitigate the risk of running malicious code at run time. The firmware run-time authentication verifies and authenticates software within power cycles to protect hardware intrusive attacks and fault injection. In an embodiment, the hardware facilities of the secure element writes (programs by burning or blowing fuses) a software checksum SWChecksum 1408 to one or more of the NVM registers 858 during the boot process and writes runtime configuration parameter to corresponding configuration registers of the secure element finite state machine 1808, which controls the cryptographic hash function 1802 and the comparator 1804. Cryptographic hash function 1802 produces a hash value HV18 from firmware 1410 and compares (1804) the hash value HV18 with the SWChecksum stored in one of the NVM registers 858. In the event that there is a match (indicated as "Yes"), the secure element continues its operation. In the event there is no match (indicated as "No"), i.e., the firmware may have been modified or compromised, the secure element disables the firmware execution. In some embodiments, the firmware run-time authentication can be triggered from different sources that may include, but is not limited to: 1) software driven by requesting an authentication through a control register in the security element; 2) hardware timer as a recurring event driven by a hardware counter set during the boot process; 3) when the secure S-CPU enters or exits a sleep period; or 4) when the secure S-CPU receives a wakeup request.

In an embodiment, the hash value of the decrypted firmware is stored in the boot certificate and is programmed into one of the NVM (one-time-programmable) registers in the secure element during the boot process so that it cannot be modified or altered. It is important to note that this process cannot be performed by the RAM-ware itself because the RAM-ware can be tampered with. Thus, the process has to be performed entirely in hardware or using code stored in ROM that cannot be modified. The SWchechsum written into a write-once memory register can be reset on power-on/off of the secure element. In addition, the secure element includes control parameters that define the source and recurrence of the run-time check.

In an embodiment, digital certificate 1100 may include runtime configuration data 1602 that is written into associated configuration registers 1809 of the secure element during the boot process. Configuration data 1602 may configure or customize the finite state machine (FSM) so that the secure element operates in a manner that is desired by a vendor or a service provider.

Figure 17:
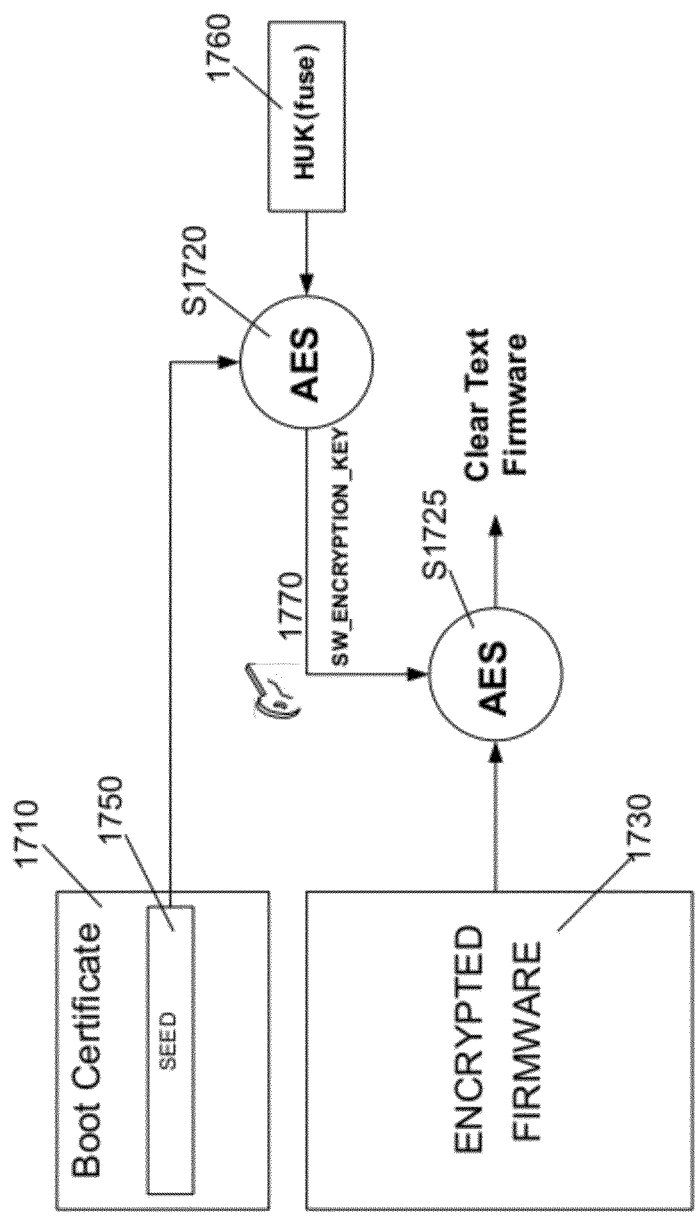
FIG. 17 is an exemplary process of decrypting or deciphering a firmware stored in the secure RAM according to an embodiment of the present invention.

FIG. 17 is an exemplary process of decrypting or deciphering a firmware stored in the secure RAM according to an embodiment of the present invention. The decryption process is optional and is only needed when the stored firmware has been previously received in an encrypted form. To decipher the encrypted firmware 1730, the secure element first retrieves a SEED 1750 disposed in a boot certificate 1710 that has been validated and thus considered to be authentic and encrypts the SEED using a unique device key 1760 (Hardware unique key that is unique and private per device and stored in a non-volatile memory register). The thus generated software encryption key 1770 at step S1720 is then used to decipher the encrypted software 1730 at step S1725.

While the advantages and embodiments of the present invention have been depicted and described, there are many more possible embodiments, applications and advantages without deviating from the spirit of the inventive ideas described herein. It will be apparent to those skilled in the art that many modifications and variations in construction and widely differing embodiments and applications of the present invention will suggest themselves without departing from the spirit and scope of the invention. For example, the hardware accelerators may include one or more AES units to generate an encryption key and/or perform data encryption. Other alternatives for firmware image validations can also be provided where steps are added, one of more steps are removed, or one or more steps are provided in a different sequence without departing from the scope of the claims herein.

It is understood that the above embodiments of the present invention are illustrative and not limitative. Various alternatives and equivalents are possible. The invention is not limited by the type of integrated circuits in which the present disclosure may be disposed. Other additions, subtractions or modifications are obvious in view of the present invention and are intended to fall within the scope of the appended claims.

What is claimed is:

1. An integrated circuit comprising:
a demodulator having an interface unit configured to receive a program file and a certificate associated with the program file from an external memory device; and
a secure element communicatively coupled to the demodulator, the secure element comprising:
a non-volatile register containing a unique identifier;
a read-only memory comprising a boot code;
a random access memory configured to store the received program file and the associated certificate; and
a processing unit coupled to the read-only memory and the random access memory and being configured to execute the boot code for authenticating the certificate stored in the random access memory;
wherein the secure element is locked after the program file and the certificate are stored in the random access memory, thereby preventing the demodulator from accessing the secure element, and wherein the secure element decrypts or deciphers the program file using an encryption key that is derived from the unique identifier and from a seed value stored in the certificate if the program file stored in the random access memory has been encrypted.

2. The integrated circuit of claim 1, wherein the authenticating the certificate stored in the random access memory comprises:

comparing a value of the certificate with the unique identifier.

3. The integrated circuit of claim 2, wherein the value of the certificate includes a first hash value of a portion of the certificate and the unique identifier includes a digest root public key.

4. The integrated circuit of claim 2, wherein the unique identifier includes a device identifier of the integrated circuit and the value of the certificate includes the unique device identifier of the integrated circuit.

5. The integrated circuit of claim 2, wherein the value of the certificate comprises a root public key.

6. The integrated circuit of claim 1, wherein the secure element disables or removes the program file from the random access memory in the event that the first hash value and the unique identifier do not match.

7. The integrated circuit of claim 1, wherein the certificate comprises information data associated with a secure state of the program file.

8. The integrated circuit of claim 7, wherein the information data comprises a public key and a digital signature associated with the program file.

9. The integrated circuit of claim 8, wherein the secure element authenticates the programs file by hashing the program file to obtain a second hash value, encrypting the second hash value with the public key to obtain an encrypted second hash value, and comparing the encrypted second hash value with the digital signature.

10. The integrated circuit of claim 9, wherein the secure element disables or removes the program file stored in the random access memory if the encrypted second hash value and the digital signature do not match.

11. The integrated circuit of claim 1, wherein the secure element performs a series of validations in the event that the first hash value matches the unique identifier.

12. The integrated circuit of claim 11, wherein the series of validations comprises one of a chain of trust verification, a boot certificate validation, a certificate binding validation, and a firmware image validation.

13. The integrated circuit of claim 12, wherein the chain of trust verification comprises a plurality layers of public key validations.

14. The integrated circuit of claim 1 further comprising a logic unit configured to encrypt the decrypted program file in the random access memory and writes the encrypted program file to the external memory device in response to a backup event.

15. The integrated circuit of claim 1, wherein the secure element authenticates the program file prior to initiating the program file.

16. A device comprising:
a unique identifier;
a processing unit;
a random access memory coupled to the processing unit;
a read-only memory coupled to the processing unit and having instruction codes that, when executed by the processing unit, causes the processing unit to:
read in a firmware image and a certificate associated with the firmware image, the certificate including a seed number, a public key, and a digital signature;
store the firmware image and the associated certificate into the random access memory;
concurrently authenticate the certificate and the firmware image, wherein the simultaneous authentication of the certificate and the firmware image comprises:
generating an encryption key using the seed number and the unique identifier;
encrypting or decrypting the firmware image using the generated encryption key;
hashing the encrypted or decrypted firmware image to obtain a hash;
encrypting the public key using the obtained hash; and
comparing the encrypted public key with the digital signature.

17. A method for authenticating program code to be executed by an information processing apparatus, the method comprising:
receiving the program code and a certificate associated with the program code from an external Flash memory device;
storing the received program code and the associated certificate in a secure random access memory disposed in the information processing apparatus;
hashing a portion of the certificate to obtain a first hash value;
comparing the first hash value with a unique identifier disposed in the information processing apparatus;
decrypting the program code in the event that the comparison returns a positive result, wherein the decrypting comprises:
generating a second encryption key by performing a first encryption algorithm on a seed value disposed in the certificate and the unique identifier; and
decrypting the program code using the second encryption key.

18. The method of claim 17 further comprising disabling or removing the stored program code in the event that the first hash value does not match the unique identifier.

19. The method of claim 17, wherein the portion of the certificate comprises information data associated with a secure state of the program code.

20. The method of claim 19, wherein the information data comprises a root public key, a public key associated with a manufacturer of the information processing apparatus or a service provider, and a signature associated with the public key.

21. The method of claim 20 further comprising:
encrypting the signature using the root public key to obtain a first encryption key; and
authenticating the program code by comparing the first encryption key with the public key.

22. The method of claim 17 further comprising:
hashing the decrypted program to obtain a second hash value; and
verifying the decrypted program by comparing the second hash value with a checksum stored in the portion of the certificate.

23. The method of claim 17 further comprising decrypting the program code, wherein the decrypting comprises:
generating a third encryption key by performing a second encryption algorithm on a crypto public key disposed in the certificate and the unique identifier; and
deciphering the program code using the third encryption key.

24. The method of claim 23 further comprising:
hashing the deciphered program code to obtain a third hash value; and
comparing the deciphered program code by comparing the third hash value with a checksum stored in the portion of the certificate.

25. A method for authenticating a firmware image by a receiver having a secure random access memory, the method comprising:

receiving the firmware image and a digital certificate associated with the firmware image from an external device, the digital certificate including a seed value;
storing the firmware image and the digital certificate in the secure random access memory;
hashing the firmware image to obtain a hash;
authenticating the firmware image by comparing the hash with a checksum stored in the digital certificate;
generating an encryption key using the seed value stored in the digital certificate and a unique identifier disposed in the receiver;
decrypting the firmware image using the generated encryption key; and
storing the decrypted firmware in the secure random access memory.

26. The method of claim 25 further comprising writing runtime configuration information stored in the digital certificate to associated registers in the receiver.

27. The method of claim 25, wherein the authenticating is triggered by software, periodically by a timer, by a wakeup event, or when the receiver enters or exits a sleep period.

28. The method of claim 25 further comprising:
encrypting the decrypted firmware stored in the secure random access memory; and
writing the encrypted firmware to an external memory device in response to a backup event.

* * * * *